(12) United States Patent
Ide

(10) Patent No.: US 8,973,978 B2
(45) Date of Patent: Mar. 10, 2015

(54) VEHICLE SOUND ABSORPTION STRUCTURE

(75) Inventor: Toyoka Ide, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/984,119

(22) PCT Filed: Feb. 1, 2012

(86) PCT No.: PCT/IB2012/000220
§ 371 (c)(1),
(2), (4) Date: Aug. 7, 2013

(87) PCT Pub. No.: WO2012/110866
PCT Pub. Date: Aug. 23, 2012

(65) Prior Publication Data
US 2013/0307290 A1 Nov. 21, 2013

(30) Foreign Application Priority Data
Feb. 14, 2011 (JP) ................................. 2011-028522

(51) Int. Cl.
*B60R 13/08* (2006.01)
*G10K 11/175* (2006.01)

(52) U.S. Cl.
CPC .............. *B60R 13/08* (2013.01); *G10K 11/175* (2013.01)
USPC ........................... 296/191; 296/39.3; 181/176

(58) Field of Classification Search
CPC ................................ G10K 11/175; B60R 13/08
USPC ........ 296/39.1, 39.3, 191; 181/175, 176, 293, 181/284
IPC .................................... B62D 25/18; B60R 13/08
See application file for complete search history.

(56) References Cited

U.S. PATENT DOCUMENTS

| | | | | |
|---|---|---|---|---|
| 2,069,413 A | * | 2/1937 | Leadbetter | 428/102 |
| 2,196,615 A | * | 4/1940 | Surprenant | 428/591 |
| 4,741,945 A | * | 5/1988 | Brant et al. | 428/158 |
| 5,462,331 A | * | 10/1995 | Stief et al. | 296/198 |
| 5,509,247 A | * | 4/1996 | Fortez et al. | 52/630 |
| 5,823,600 A | * | 10/1998 | Iwao | 296/39.3 |
| 6,509,084 B2 | * | 1/2003 | Sturtevant et al. | 428/141 |
| 6,641,194 B2 | * | 11/2003 | Fujii et al. | 296/39.3 |
| 6,820,923 B1 | * | 11/2004 | Bock | 296/187.02 |
| 6,966,594 B2 | * | 11/2005 | Wojewnik | 296/39.3 |

(Continued)

FOREIGN PATENT DOCUMENTS

| | | |
|---|---|---|
| EP | 1 298 036 A1 | 4/2003 |
| JP | U 3048125 | 5/1998 |
| JP | A 2000-1178 | 1/2000 |
| JP | A 2004-26060 | 1/2004 |
| JP | A 2005-17635 | 1/2005 |

*Primary Examiner* — Pinel Romain
(74) *Attorney, Agent, or Firm* — Oliff PLC

(57) ABSTRACT

A vehicle sound absorption structure has: a recessed cell that has an opening on one end of the cell; a divider that is provided within the cell and that divides an acoustic wave entering the cell from the opening into two acoustic waves; reflectors that reflect one of the two acoustic waves divided at the divider and reflect the other acoustic wave respectively toward the opening, and that generate a phase difference between the one acoustic wave and the other acoustic wave; and an interfering portion that is provided within the cell and that causes the one acoustic wave and the other acoustic wave, which have been respectively reflected at the reflectors, to interfere with each other.

17 Claims, 22 Drawing Sheets

(56) References Cited

U.S. PATENT DOCUMENTS

| | | |
|---|---|---|
| 7,497,509 B2 * | 3/2009 | Omiya et al. ............... 296/198 |
| 2004/0060771 A1 | 4/2004 | D'Antonio et al. |
| 2004/0248490 A1 * | 12/2004 | Hyuga et al. ............... 442/327 |
| 2006/0214474 A1 * | 9/2006 | Omiya et al. ............... 296/198 |
| 2008/0099278 A1 * | 5/2008 | Simon et al. ............... 181/293 |

* cited by examiner

F I G . 12
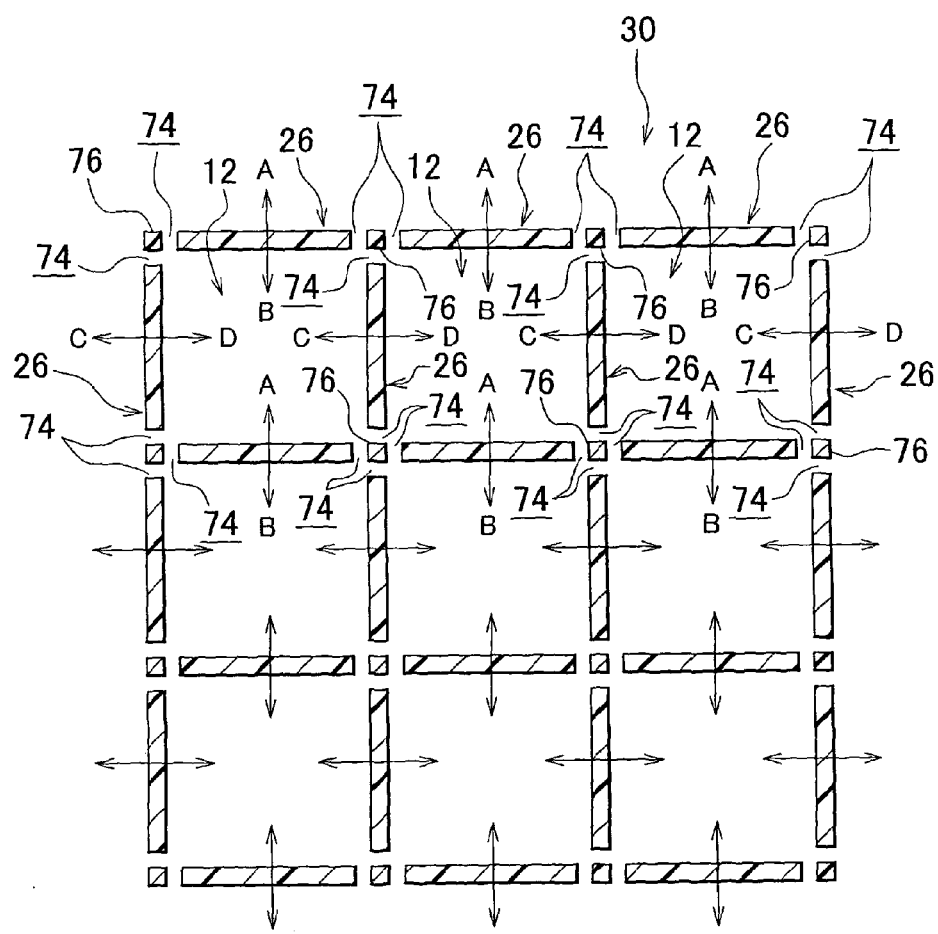

VEHICLE SOUND ABSORPTION STRUCTURE

BACKGROUND OF THE INVENTION

1. Field of the Invention

The present invention relates to a vehicle sound absorption structure.

2. Description of Related Art

Japanese Utility Model No. 3048125 (JP-U-3048125) discloses an acoustic insulation material that is intended to prevent noise, such as engine sound generated in the engine compartment, road noise generated during driving, and wind whistle sound, from entering the car cabin through the door seal. The acoustic insulation material, when in use, is fitted onto the cross section of the front fender of the car. The acoustic insulation material uses a cushion material that has a predetermined density. The cushion material is either coated with a film or not coated with any film, but subjected to waterproof treatment.

As described in JP-U-3048125, the special cushion material that has a predetermined density is coated with a film or is subjected to waterproof treatment on the surface of the cushion material. However, this causes an increase in costs of the cushion material, an increase in number of parts, and an increase in processing costs and management costs.

SUMMARY OF THE INVENTION

The present invention provides a low-cost vehicle sound absorption structure.

A first aspect of the present invention is related to a vehicle sound absorption structure that has: a recessed cell that has an opening on one end thereof; a divider that is provided within the cell and that divides an acoustic wave entering the cell from the opening into two acoustic waves; reflectors that reflect one of the two acoustic waves divided at the divider and reflect the other acoustic wave respectively toward the opening, and that generate a phase difference between the one acoustic wave and the other acoustic wave; and an interfering portion that is provided within the cell and that causes the one acoustic wave and the other acoustic wave, which have been reflected respectively at the reflectors, to interfere with each other.

According to the first aspect of the invention, an acoustic wave enters the cell from the opening of the cell and is divided at the divider into two acoustic waves. When the two acoustic waves are reflected respectively at the reflectors, a phase difference is generated between the one acoustic wave and the other acoustic wave. The one acoustic wave and the other acoustic wave interfere with each other at the interfering portion, while having the phase difference, so that a sound absorption effect is produced. This allows the vehicle sound absorption structure to be provided at low cost without increasing the number of parts.

According to the first aspect of the invention, an end of the divider on the side of the opening may be positioned more inward in the cell than the opening and positioned closer to the opening than one of the reflectors. The one of the reflectors may be positioned closer to the opening than the other reflector. The interfering portion may be positioned between the end and the opening.

As described above, the vehicle sound absorption structure according to the first aspect of the invention has an excellent effect of providing the low-cost vehicle sound absorption structure.

In the above aspect, the divider may have an end on the side of the opening and positioned more inward in the cell than the opening, while being positioned closer to the opening than one of the reflectors, the one of the reflectors being positioned closer to the opening than the other reflector. And, the interfering portion may be positioned between the opening and the end of the divider. This allows an acoustic wave that enters the cell to be absorbed in the cell.

The vehicle sound absorption structure according to the first aspect of the invention has an excellent effect of producing the sound absorption effect in the cell in a stable manner.

In the first aspect of the invention, the vehicle sound absorption structure may further include a cover member that covers the opening. The cover member may have a slit that is provided on an extension of the divider.

According to the first aspect of the invention, when incident acoustic waves obliquely to the depth direction of the cell enter the cell through the slit, the acoustic waves become in phase due to a diffraction phenomenon through the slit. This ensures that the one acoustic wave and the other acoustic wave that are divided at the divider have a desired phase difference therebetween. Therefore, the vehicle sound absorption structure has improved sound absorption performance with respect to the acoustic wave frequency of the sound to be absorbed.

The vehicle sound absorption structure according to the first aspect of the invention has an excellent effect of improving the sound absorption performance with respect to the acoustic wave frequency of the sound to be absorbed.

In the first aspect of the invention, the slit may extend in a direction along the end of the divider.

As described above, the slit extends in a direction along the end of the divider. Thus, when acoustic waves enter the cell through the slit, the acoustic waves become in phase over a wide frequency range due to a diffraction phenomenon. Therefore, the vehicle sound absorption structure has further improved sound absorption performance with respect to the acoustic wave frequency of the sound to be absorbed.

The vehicle sound absorption structure according to the first aspect of the invention has an excellent effect of further improving the sound absorption performance with respect to the acoustic wave frequency of the sound to be absorbed.

In the first aspect of the invention, the cell may be partitioned by a wall that includes a base part and the other part, and the base part may be thinner than the other part.

As described above, the cell is partitioned by a wall that includes a base part and the other part, and the base part is thinner than the other part. Thus, upon the entry of an acoustic wave into the cell, film resonance occurs on the wall that partitions the cell. Due to the film resonance, energy of the acoustic wave is converted into kinetic energy, so that the sound is absorbed. This further improves the sound absorption performance.

The vehicle sound absorption structure according to the first aspect of the invention has an excellent effect of further improving the sound absorption performance.

In the first aspect of the invention, the vehicle sound absorption structure may also serve as a fender protector that shields a gap between a vehicle body framework and a rear end of a front fender panel, the rear end being positioned inner side of the vehicle. The opening may be formed toward the front side of the vehicle.

The vehicle sound absorption structure according to the first aspect of the invention also serves as a fender protector, and the opening is formed toward the front side of the vehicle. This allows noise from a front tyre to be absorbed without increasing the number of parts.

The vehicle sound absorption structure according to the first aspect of the invention has an excellent effect of absorbing the noise from the front tyre without increasing the number of parts.

In the first aspect of the invention, the vehicle sound absorption structure may be provided on a front surface of the fender protector that shields the gap between the vehicle body framework and the rear end of the front fender panel, in which the front surface faces toward the front side of the vehicle, and the rear end is positioned inner side of the vehicle.

As described above, the vehicle sound absorption structure is provided on the front surface of the fender protector, the front surface facing toward the front side of the vehicle. This enables the noise from the front tyre to be absorbed.

The vehicle sound absorption structure according to the first aspect of the invention has an excellent effect of absorbing road noise from the front tyre.

In the first aspect of the invention, the vehicle sound absorption structure may be formed in combination with the fender protector. The front surface of the fender protector may be utilised as the reflectors, and the front surface faces toward the front side of the vehicle.

As described above, the front surface of the fender protector is utilised as the reflectors. This enables reductions in material costs of and in weight of the vehicle-sound absorption structure, compared to the case when the reflector is continuously formed with a wall of the cell.

The vehicle sound absorption structure according to the first aspect of the invention has an excellent effect of reducing the material costs and the weight, compared to the case when the reflector is continuously formed with a wall of the cell.

In the first aspect of the invention, the vehicle sound absorption structure may also serve as at least one of an engine cover and a floor under cover.

In the first aspect of the invention, the vehicle sound absorption structure may also serve as a fender liner that is formed on an inside of the front fender panel to cover the front tyre. The opening may be formed toward the front side of the vehicle.

In the first aspect of the invention, a plurality of the cells may be arranged in parallel in a vertical direction with the opening of each of the cells facing toward the front side of the vehicle. Communicating holes communicate with a lower adjacent one of the cells may be formed on lower walls of the cells.

As described above, a plurality of the cells are arranged in parallel in a vertical direction with the opening of each of the cells facing toward the front side of the vehicle. This allows the sound absorption effect to be produced in a wide region. In addition, the cells each have lower walls through which communication holes are formed. The communication holes communicate with a lower adjacent one of the cells. This provides an additional function as an expansion silencer. Further, water in the cell can be drained through the communication holes. This further improves the sound absorption performance, while preventing the water from remaining in the cell to maintain the sound absorption performance.

The vehicle sound absorption structure according to the first aspect of the invention has an excellent effect of further improving the sound absorption performance, while preventing the water from remaining in the cell to maintain the sound absorption performance.

In the first aspect of the invention, the lower walls may be angled downwardly to the front side of the vehicle.

As described above, the lower walls of the cell are angled downwardly to the front side of the vehicle. This makes it difficult for the water to remain in the cell.

The vehicle sound absorption structure according to the first aspect of the invention has an excellent effect of making it difficult for the water to remain in the cell.

In the first aspect of the invention, the communication holes may be provided on the lower walls at respective ends that face toward the rear side of the vehicle.

As described above, the communication holes are provided on the lower walls at respective ends that face toward the rear side of the vehicle. Thus, when the vehicle is accelerating, the water in the cell flows toward the rear side of the vehicle to be efficiently discharged out of the cell through the communication holes.

The vehicle sound absorption structure according to the first aspect of the invention has an excellent effect of efficiently discharging the water flowing in the cell toward the rear side of the vehicle out of the cell through the communication holes when the vehicle is accelerating.

In the first aspect of the invention, the vehicle sound absorption structure may further include a Helmholtz resonator that is provided adjacent to the cells and that has a neck and a cavity, and the neck may be open in the same direction as the opening. The neck may be an opening of the Helmholtz resonator. This opening may be defined by the walls.

According to the first aspect of the invention, the Helmholtz resonator is provided adjacent to the cells to further improve the sound absorption performance.

The vehicle sound absorption structure according to the first aspect of the invention has an excellent effect of further improving the sound absorption performance by using the Helmholtz resonator that is provided adjacent to the cells.

In the first aspect of the invention, a volume of the cavity, a diameter of the neck or a length of the neck may be varied in order to adjust sound-absorption characteristics of the Helmholtz resonator.

In the first aspect of the invention, the cavity may be formed into a trapezium or trapezoid shape.

In the first aspect of the invention, the vehicle sound absorption structure may further has: a primary tubular passage that is provided adjacent to the cells and is open toward the same direction as the opening; and a secondary tubular passage that is branched from the primary tubular passage at a midsection of the primary tubular passage and that rejoins the primary tubular passage at a point where the primary tubular passage and the secondary tubular passage join together. The primary tubular passage and the secondary tubular passage may respectively have predetermined lengths such that an acoustic wave passing through the primary tubular passage alone and another acoustic wave passing through the primary tubular passage via the secondary tubular passage have a phase difference therebetween at the point where the primary tubular passage and the secondary tubular passage join together.

As described above, the acoustic wave passing through the primary tubular passage alone and the another acoustic wave passing through the primary tubular passage via the secondary tubular passage have a phase difference therebetween, and then interfere with each other at the point where the primary tubular passage and the secondary tubular passage join together. Consequently, the sound absorption effect is produced. This still further improves the sound absorption performance.

The vehicle sound absorption structure according to the first aspect of the invention has an excellent effect of still further improving the sound absorption performance.

A second aspect of the present invention is related to a front fender structure that has: a front fender panel; a fender protector that shields a gap between a vehicle body framework and a rear end of the front fender panel, the rear end facing toward the inner side of the vehicle; and a vehicle sound absorption structure according to the first aspect of the invention, the vehicle sound absorption structure being mounted onto a front surface of the fender protector with the opening facing toward the front side of the vehicle, the front surface facing toward the front side of the vehicle.

According to the second aspect of the invention, noise from the front tyre is absorbed at low cost.

The vehicle sound absorption structure according to the second aspect of the invention has an excellent effect of absorbing noise from the front tyre at low cost.

In the second aspect of the invention, a plurality of the cells may be arranged in parallel in the vertical direction, the cells may each have lower walls through which communication holes are formed, and the communication holes may communicate with a lower adjacent one of the cells.

As described above, a plurality of the cells are arranged in parallel in the vertical direction. This allows the sound absorption effect to be produced in a wide region. In addition, the cells each have lower walls through which communication holes are formed. The communication holes communicate with a lower adjacent one of the cells. This provides an additional function as an expansion silencer. Further, water in the cell can be drained through the communication holes. This further improves the sound absorption performance, while preventing the water from remaining in the cell to maintain the sound absorption performance.

The vehicle sound absorption structure according to the second aspect of the invention has an excellent effect of further improving the sound absorption performance, while preventing the water from remaining in the cell to maintain the sound absorption performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12 is a sectional view that illustrates film resonance that occurs on walls;

DETAILED DESCRIPTION OF EMBODIMENTS

Figure 1:
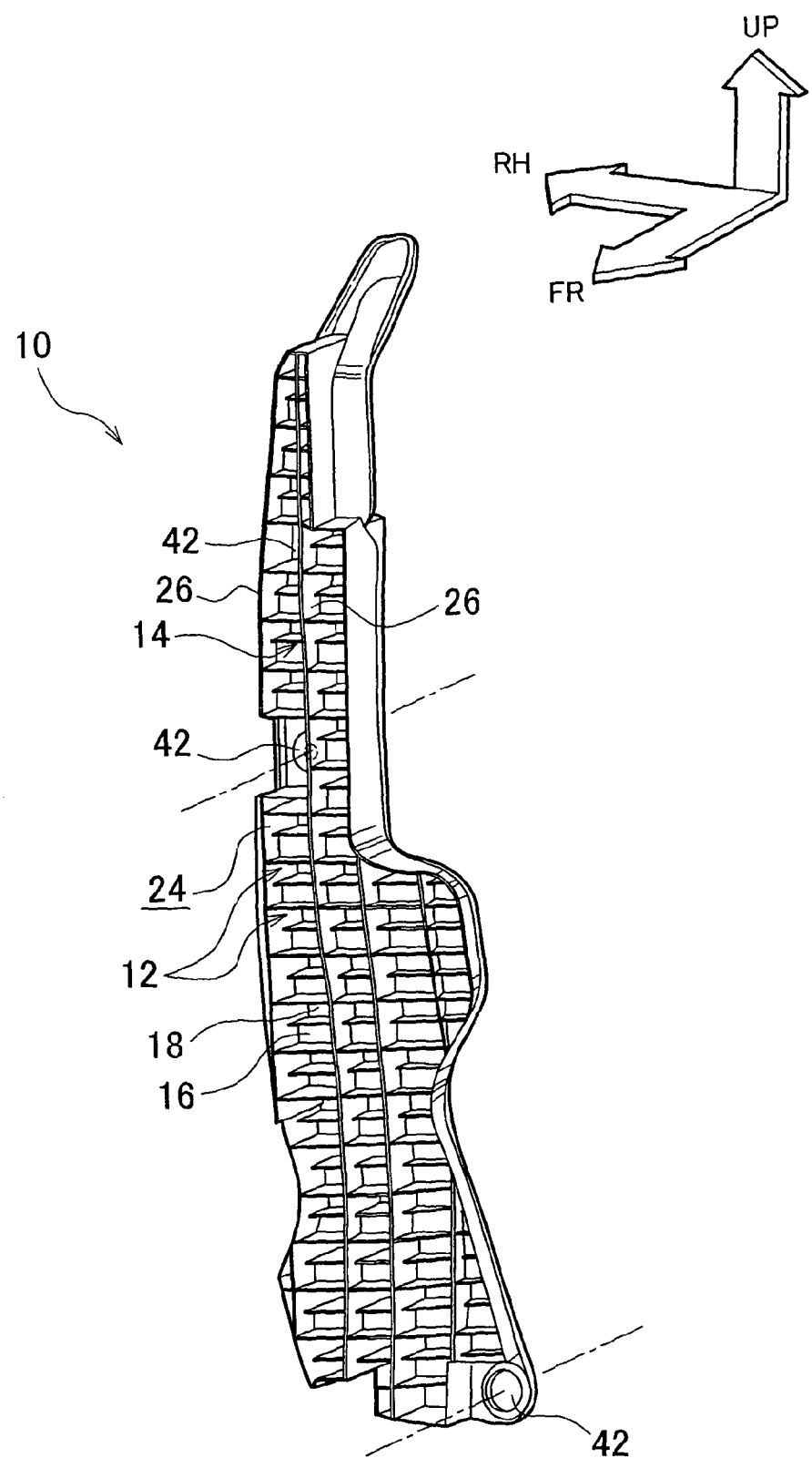
FIG. 1 is a perspective view of a vehicle sound absorption structure according to a first embodiment of the invention, when viewed from the front side of the vehicle.

Embodiments of the present invention will be described below with reference to the accompanying drawings.

[First Embodiment] As illustrated in FIG. 1 to FIG. 4, a vehicle sound absorption structure 10 according to the first embodiment of the invention is a single molded piece of, for example, synthetic resin. The vehicle sound absorption structure 10 has recessed cells 12, dividers 14, reflectors 16 and 18, and interfering portions 22.

Figure 3:
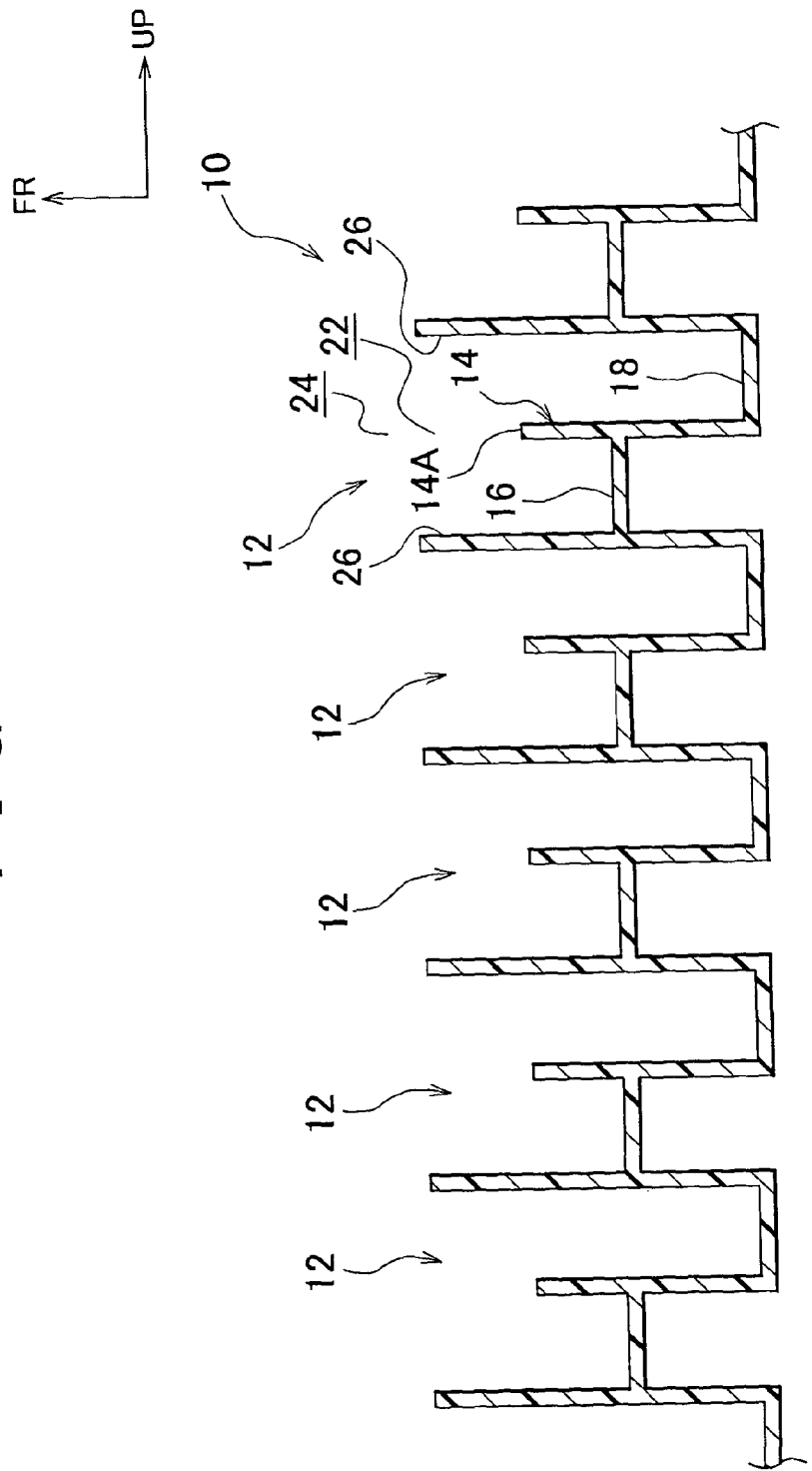
FIG. 3 is an enlarged sectional view of the vehicle sound absorption structure according to the first embodiment of the invention.
Figure 4:
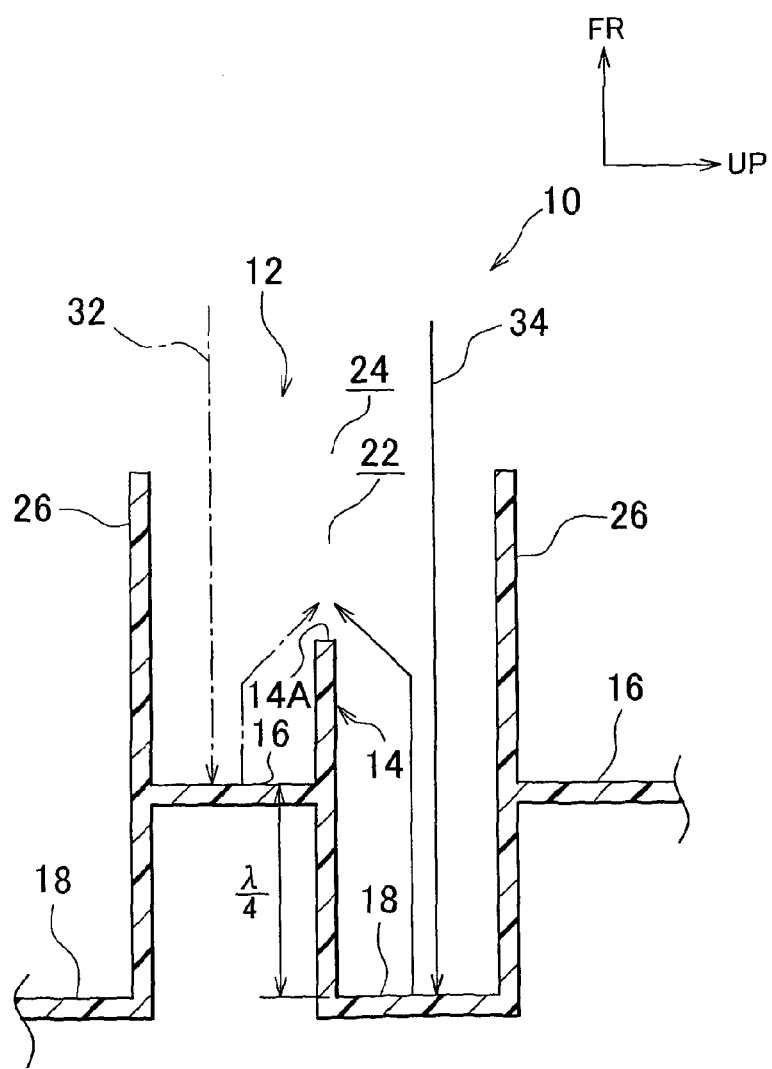
FIG. 4 is an enlarged sectional view of the vehicle sound absorption structure that illustrates a sound absorption effect within a cell.

As illustrated in FIG. 3 and FIG. 4, the cells 12 are partitioned from each other by walls 26. The cells 12 each have an opening 24 on one end of the cell 12. In the vehicle sound absorption structure 10, the plural cells 12 are arranged in parallel, for example, in the vertical and lateral directions with the respective openings 24 facing toward the front side of the vehicle.

The dividers 14 each are provided within the cell 12 to divide an acoustic wave that enters the cell 12 from the opening 24 into two acoustic waves. The divider 14 extends, for example, in the vehicle width direction between the left and right walls 26. The divider 14 has an end 14A on the side of the opening 24 and positioned more inward in the cell 12 than the opening 24. In other words, the end 14A is positioned more inward than a plane (not illustrated) that connects the walls 26 at their ends on the side of the openings 24. Also, the end 14A is positioned closer to the opening 24 than the reflector 16. The reflector 16 is positioned closer to the opening 24 than the reflector 18.

The divider 14 divides an acoustic wave into one acoustic wave 32 and the other acoustic wave 34. The reflectors 16 and 18 are designed respectively to reflect the one acoustic wave 32 and the other acoustic wave 34 toward the opening 24. The reflectors 16 and 18 are also designed to generate a phase difference between the one acoustic wave 32 and the other acoustic wave 34. A depth from the opening 24 to the reflector 18 is greater than a depth from the opening 24 to the reflector 16.

As illustrated in FIG. 3 and FIG. 4, the interfering portions 22 each are provided within the cell 12. The interfering portion 22 is designed to cause the one acoustic wave 32 reflected at the reflector 16 and the other acoustic wave 34 reflected at the reflector 18 to interfere with each other. The interfering portion 22 is positioned between the opening 24 and the end 14A of the divider 14. The end 14A of the divider 14 is located more inward than the opening 24, thus to define a space or the interfering portion 22 within the cell 12.

Figure 5:
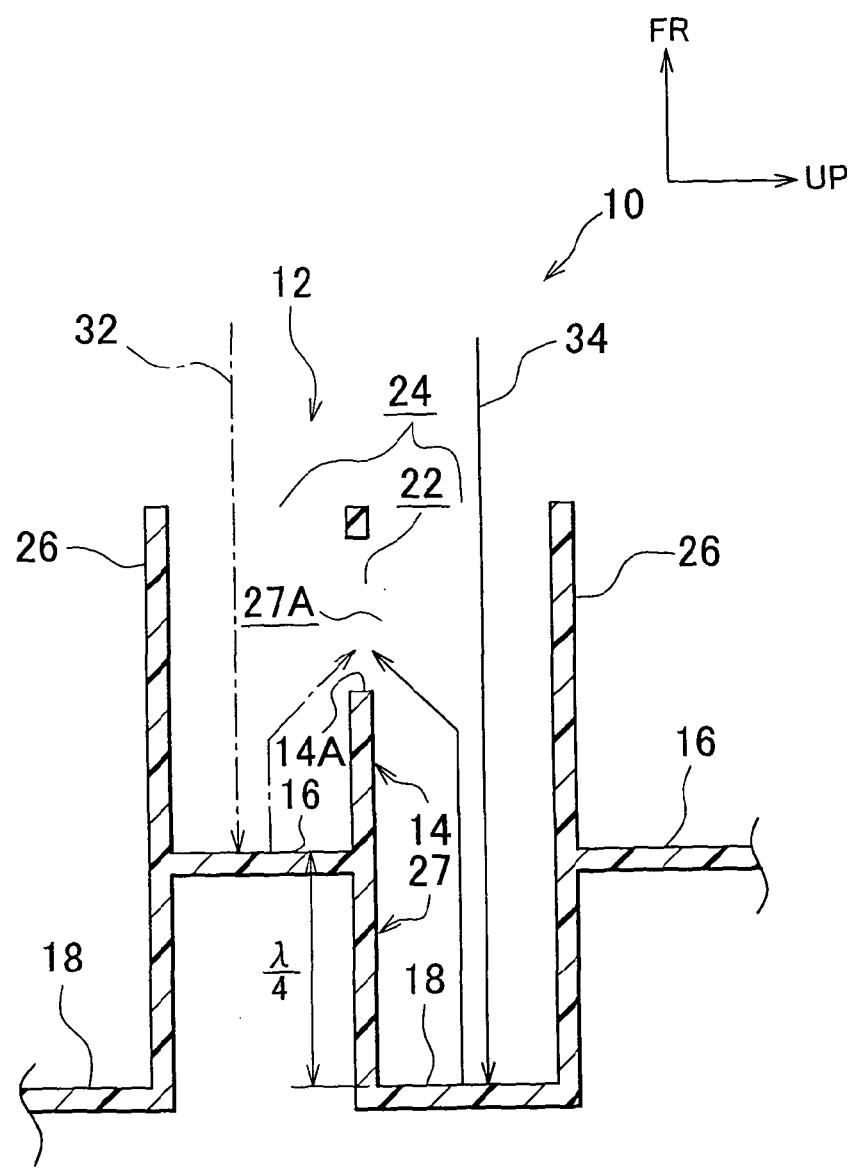
FIG. 5 is an enlarged sectional view of a modification of the vehicle sound absorption structure according to the first embodiment of the invention.

It should be understood that, as illustrated in FIG. 5, a wall 27 may extend to the opening 24 in a fashion similar to the wall 26, and may have a window 27A that serves as the interfering portion 22. Then, an innermost one of the edges of the window 27A in the cell 12 may be the end 14A of the divider 14.

As illustrated in FIG. 4, when $\lambda$ is the wavelength of the acoustic wave frequency of the sound to be absorbed, a difference between the depth from the opening 24 to the reflector 16 and the depth from the opening 24 to the reflector 18 may be set to $\lambda/4$. In other words, the distance from the reflector 16 to the reflector 18 is defined as $\lambda/4$. An acoustic wave enters the cell 12 from the opening 24 and is divided at the divider 14 into the two acoustic waves 32 and 34. Then, these acoustic waves 32 and 34 are reflected at the respective reflectors 16 and 18. This results in a phase difference of $2\times\lambda/4=\lambda/2$ (a half wavelength) between the acoustic waves 32 and 34 when the acoustic waves 32 and 34 interfere with each other at the interfering portion 22 after the reflection. Then, the acoustic waves 32 and 34 interfere with each other and cancel each other out. This improves the sound absorption coefficient.

It should be understood that in the case the sound to be absorbed has plural frequencies, the cells 12 can have different structures that correspond to various wavelengths $\lambda$ of the plural frequencies, and these cells 12 can be used in combination.

Figure 7:
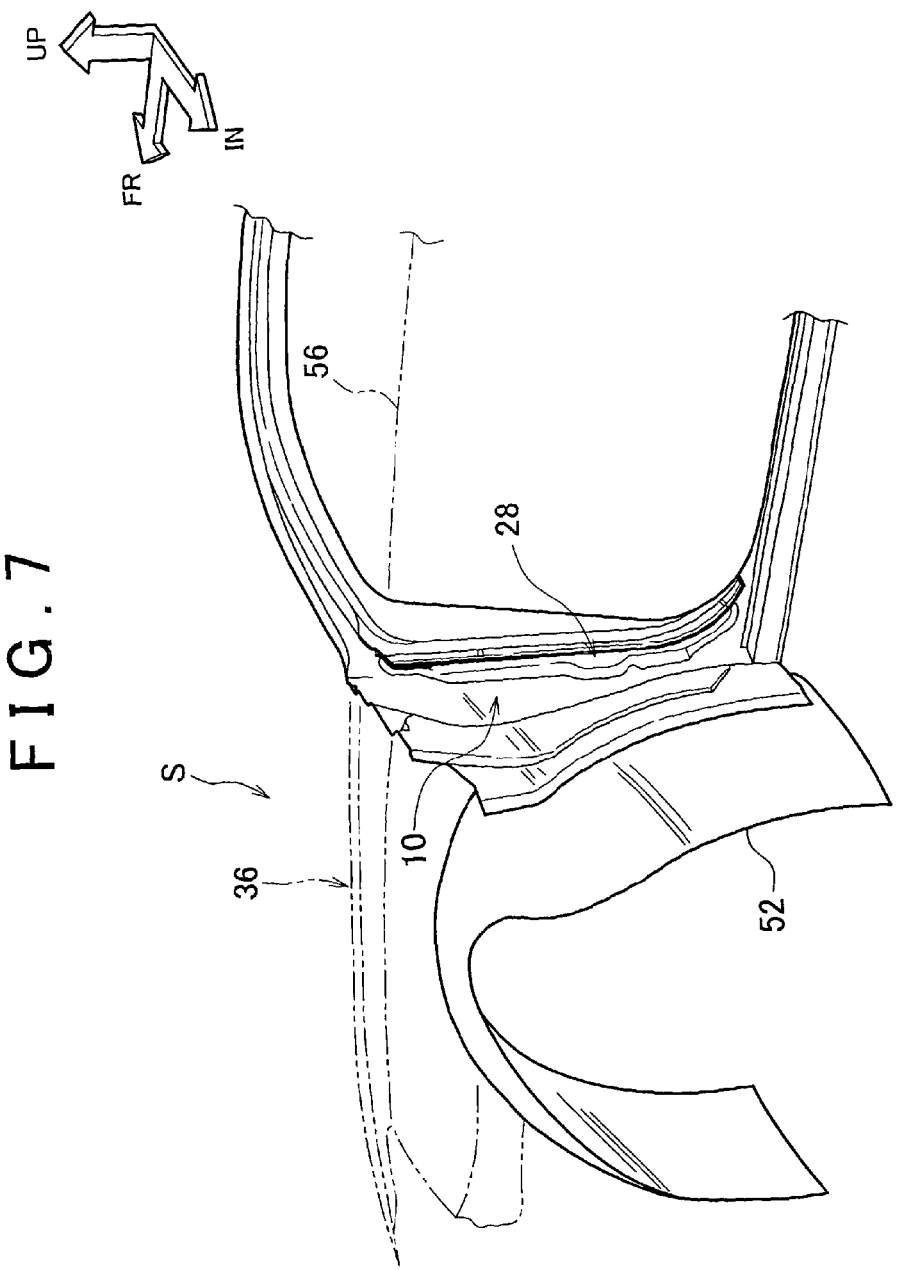
FIG. 7 is a perspective view of a front fender structure that uses the vehicle sound absorption structure according to the first embodiment of the invention.
Figure 8:
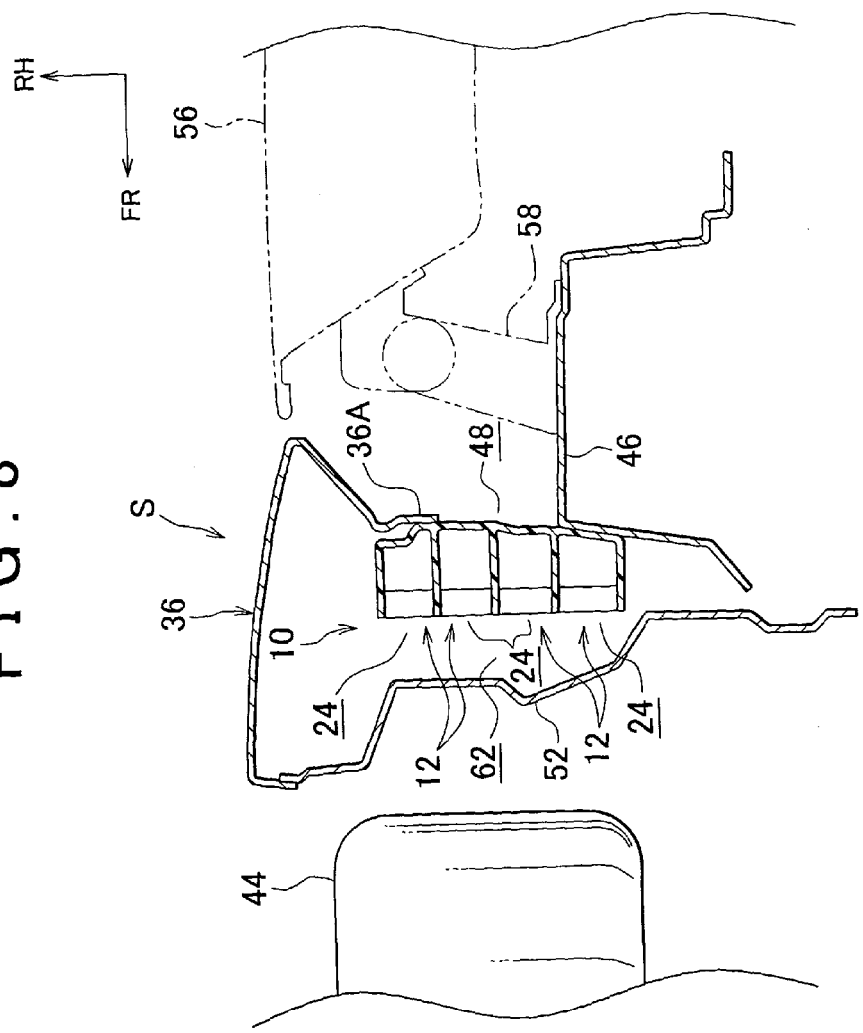
FIG. 8 is a sectional view of the front fender structure.

As illustrated in FIG. 7 and FIG. 8, a front fender structure S has a front fender panel 36 and the vehicle sound absorption structure 10. The vehicle sound absorption structure 10 also serves as a separate fender protector 28. The fender protector 28 will be described later. The front fender panel 36 includes a rear end 36A that is positioned inner side of the vehicle. The fender protector is typically a member designed to shield a gap 48 between the rear end 36A and a vehicle body framework 46. The vehicle sound absorption structure 10 according to the first embodiment of the invention is the fender protector with a sound absorption function.

The front fender panel 36 is a member that forms a front outside surface of the vehicle. An arch-shaped fender liner 52 is mounted to the inside of the front fender panel 36. The fender liner 52 covers a front tyre 44.

As illustrated in FIG. 8, the vehicle body framework 46 is, for example, a front pillar on which a door 56 is mounted through a hinge 58. The vehicle sound absorption structure 10 also serves as the fender protector. This prevents water from entering through the gap 48, adhering to the hinge 58, and freezing in cold climates.

Figure 2:
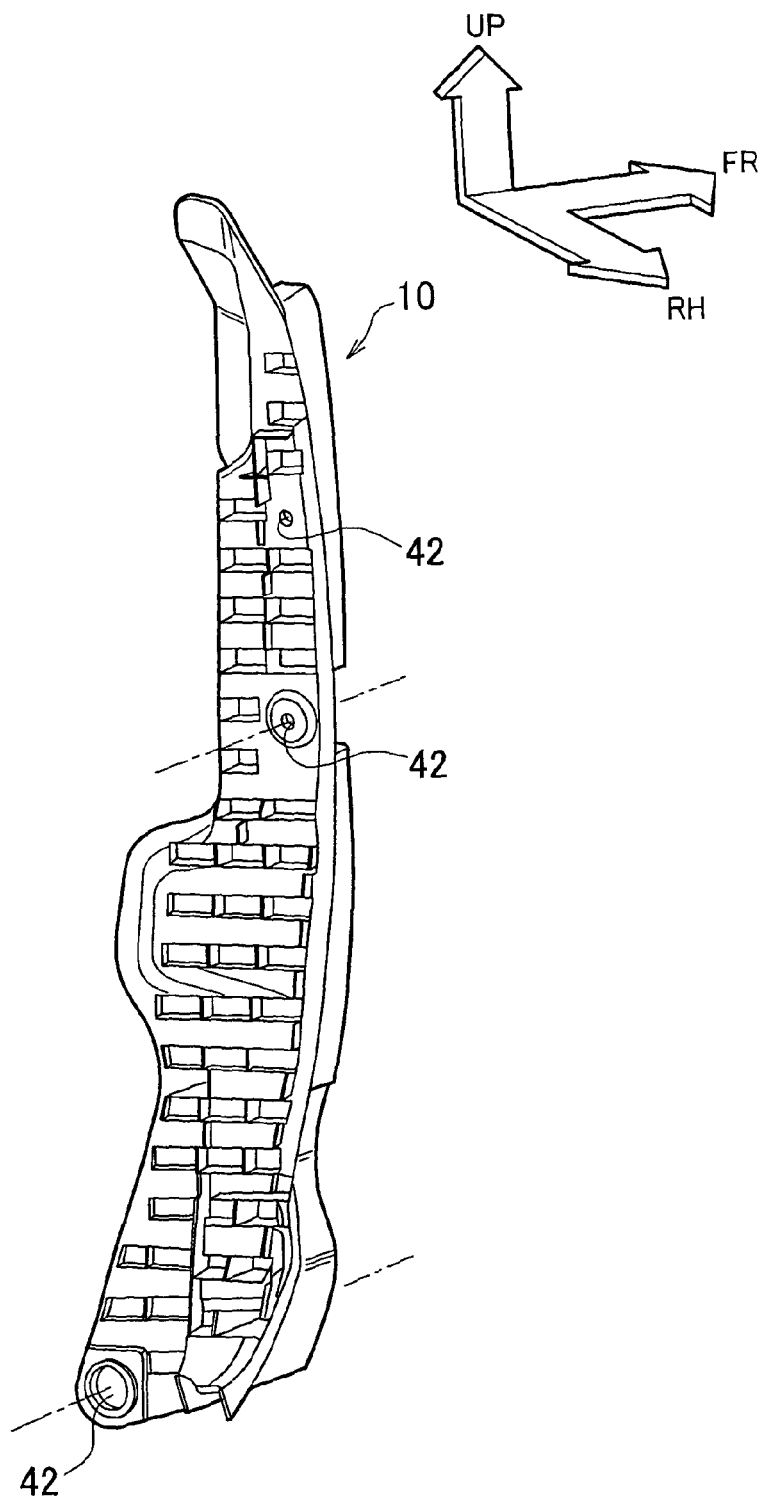
FIG. 2 is a perspective view of the vehicle sound absorption structure according to the first embodiment of the invention, when viewed from the rear side of the vehicle.

The vehicle sound absorption structure 10 is mounted using, for example, a clip (not illustrated) such that the vehicle sound absorption structure 10 shields the gap 48 between the vehicle body framework 46 and the rear end 36A of the front fender panel 36. The rear end 36A is positioned inner side of the vehicle. This mounting condition ensures a gap 62 between the fender liner 52 and the vehicle sound absorption structure 10. As illustrated in FIG. 1 and FIG. 2, the vehicle sound absorption structure 10 has, for example, three securing points 42 through which the clips (not illustrated) are installed.

The vehicle sound absorption structure 10 according to the first embodiment of the invention has the aforementioned configuration, and the effect of vehicle sound absorption structure 10 will be described below. As illustrated in FIG. 4, in the vehicle sound absorption structure 10 according to the first embodiment of the invention, an acoustic wave enters the cell 12 from the opening 24 of the cell 12, and is divided at the divider 14 into the two acoustic waves 32 and 34. It should be understood that although the two acoustic waves 32 and 34 are separately illustrated in the drawings for simplification, the acoustic waves 32 and 34 are derived from an acoustic wave (not illustrated) that enters the cell 12 and that is then divided at the divider 14. The one acoustic wave 32 is reflected at the reflector 16, while the other acoustic wave 34 is reflected at the reflector 18. The reflector 18 lies in a deeper position of the cell 12, compared to the reflector 16. This results in a phase difference between the reflected acoustic waves 32 and 34. Then, these reflected acoustic waves 32 and 34 interfere with each other at the interfering portion 22, while having the phase difference therebetween. This produces a sound absorption effect.

Specifically, when $\lambda$ is the wavelength of the acoustic wave frequency of the sound to be absorbed and a difference between the depth from the opening 24 to the reflector 16 and the depth from the opening 24 to the reflector 18 (the distance from the reflector 16 to the reflector 18) is equal to $\lambda/4$, an acoustic wave that enters the cell 12 from the opening 24 is divided at the divider 14 into the two acoustic waves 32 and 34. Then, these acoustic waves 32 and 34 are reflected at the respective reflectors 16 and 18. This results in a phase difference of $2\times\lambda/4=\lambda/2$ (a half wavelength) between the acoustic waves 32 and 34 after the reflection, where the acoustic waves 32 and 34 interfere with each other at the interfering portion 22.

Figure 6:
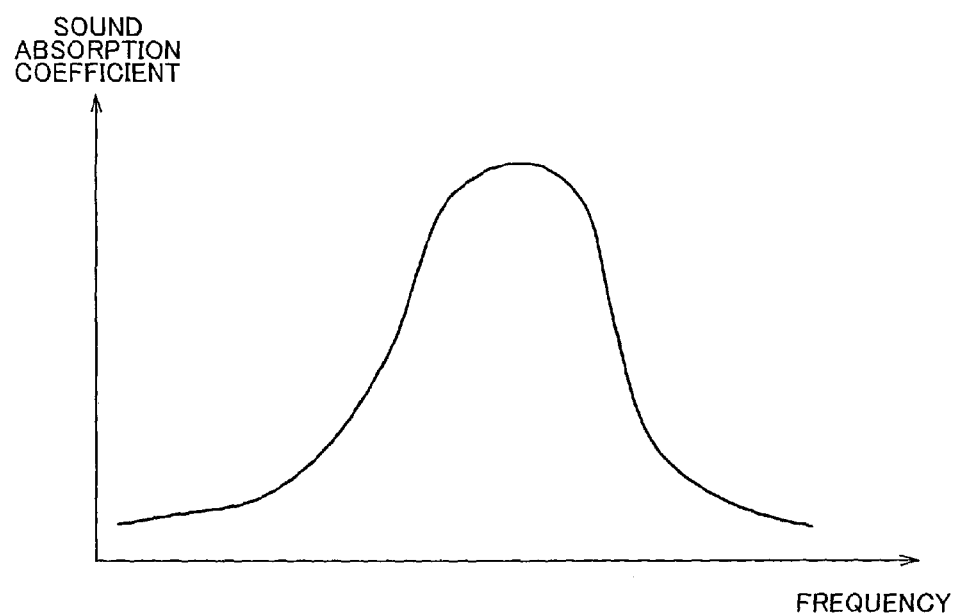
FIG. 6 is a chart that illustrates the relationship between a frequency and a sound absorption coefficient.

The one acoustic wave 32 and the other acoustic wave 34 that have the phase difference of a half wavelength therebetween interfere with each other, and cancel each other out, at the interfering portion 22. This results in the maximum sound absorption coefficient with respect to the acoustic wave frequency of the sound to be absorbed, as illustrated in FIG. 6. The end 14A of the divider 14 is on the side of the opening 24 and is positioned more inward in the cell 12 than the opening 24, while being positioned closer to the opening 24 than the reflector 16. The reflector 16 is positioned closer to the opening 24 than the reflector 18. The interfering portion 22 is positioned between the end 14A and the opening 24. This allows an acoustic wave that enters the cell 12 to be absorbed in the cell 12. Consequently, a sound absorption effect is produced in the cell 12 in a stable manner.

As described above, according to the first embodiment of the invention, the vehicle sound absorption structure 10 is provided at low cost without increasing the number of parts.

As illustrated in FIG. 8, in the front fender structure S, the vehicle sound absorption structure 10 also serves as a fender protector, and is provided such that the plural cells 12 are arranged in parallel in the vertical direction with their respective openings 24 facing toward the front side of the vehicle. The front fender structure S allows the sound absorption effect to be produced in a wide region, and thus allows noise from the front tyre 44 to be absorbed efficiently at low cost.

It should be understood that the vehicle sound absorption structure 10 is not limited to the one that is used as a fender protector, but may also be applied to various components of the vehicle, such as an engine cover (not illustrated), a floor under cover (not illustrated), and the fender liner 52. It should also be understood that the vehicle sound absorption structure 10 may be formed on at least one of the fender protector, the engine cover, the floor undercover, and the fender liner 52.

Figure 9:
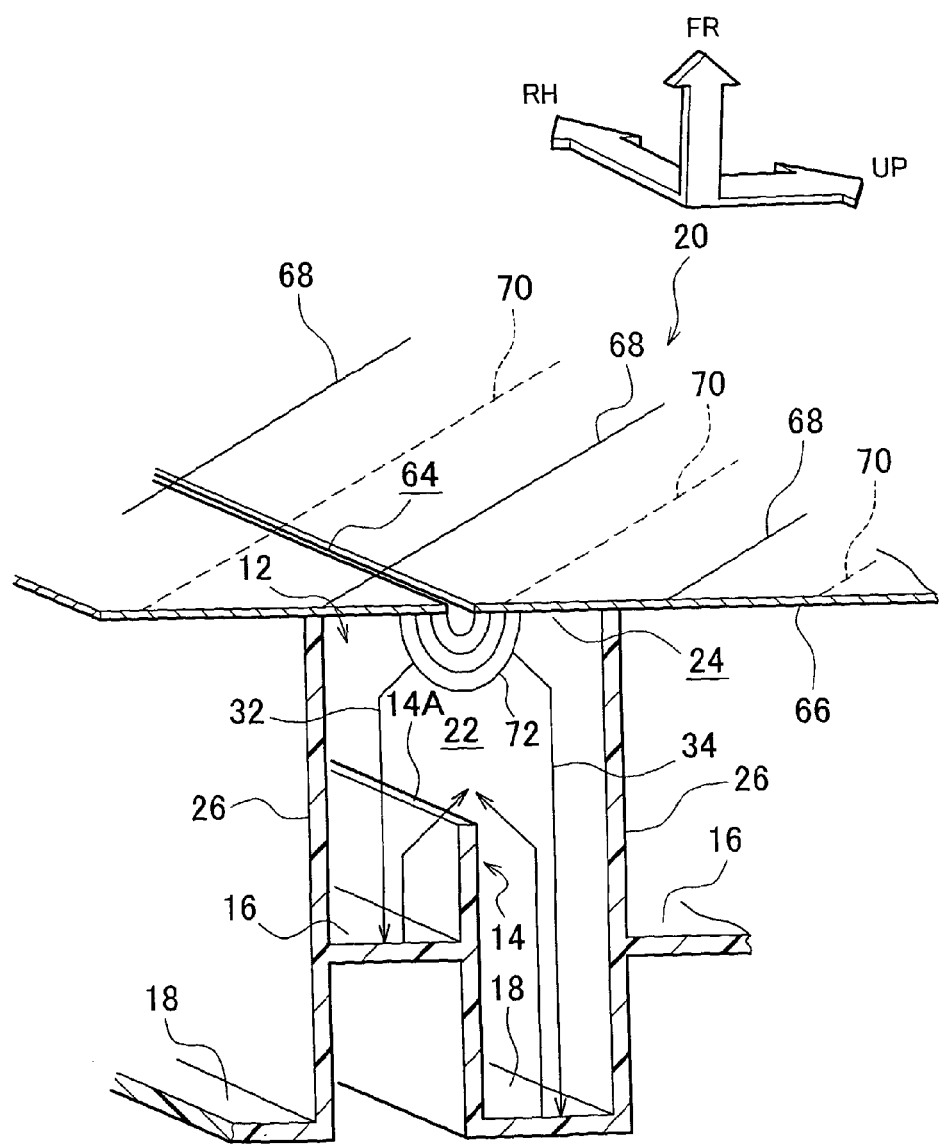
FIG. 9 is an enlarged perspective sectional view of the vehicle sound absorption structure according to a second embodiment of the invention.

[Second Embodiment] As illustrated in FIG. 9, a vehicle sound absorption structure 20 according to the second embodiment of the invention includes a film member 66 over the opening 24. The film member 66 is an example of a cover member. The film member 66 is formed over a plane (not illustrated) that connects the walls 26 at their ends on the side of the openings 24. The film member 66 has a slit 64 that is provided on an extension of the divider 14 or at a position where an imaginary line (not illustrated) that extends from the divider 14 toward the opening 24 intersects the film member 66. The slit 64 extends in the direction along the end 14A of the divider 14 or in the vehicle width direction.

Other portions of the vehicle sound absorption structure 20 are the same as those according to the first embodiment. Therefore, in the drawings, like numerals are used to represent like elements, and the description of the like elements is not repeated.

The vehicle sound absorption structure 20 according to the second embodiment of the invention has the aforementioned configuration, and the effect of vehicle sound absorption structure 20 will be described below. An acoustic wave can be incident from any direction relative to the cell 12 in a random manner. In the structure according to the first embodiment, an acoustic wave is obliquely incident to the depth direction of the cell 12, and accordingly, peaks 68 and troughs 70 (wavefronts) of the acoustic wave enter the cell 12 in the oblique direction. This does not always result in a distance difference of a half wavelength between the distance from the wavefronts to the reflector 16 and the distance from the wavefronts to the reflector 18.

However, as illustrated in FIG. 9, in the vehicle sound absorption structure 20 according to the second embodiment, when an acoustic wave incident obliquely to the depth direction of the cell 12 enters the cell 12 through the slit 64, the phases of the wavefronts 72 of the acoustic wave are matched due to a diffraction phenomenon through the slit 64. This allows the one acoustic wave 32 and the other acoustic wave 34 that are divided at the divider 14 to be in phase, and thus ensures that the one acoustic wave 32 and the other acoustic wave 34 have a particular phase difference therebetween after the acoustic waves 32 and 34 are reflected. Therefore, the vehicle sound absorption structure 20 has improved sound absorption performance with respect to the acoustic wave frequency of the sound to be absorbed.

Figure 10:
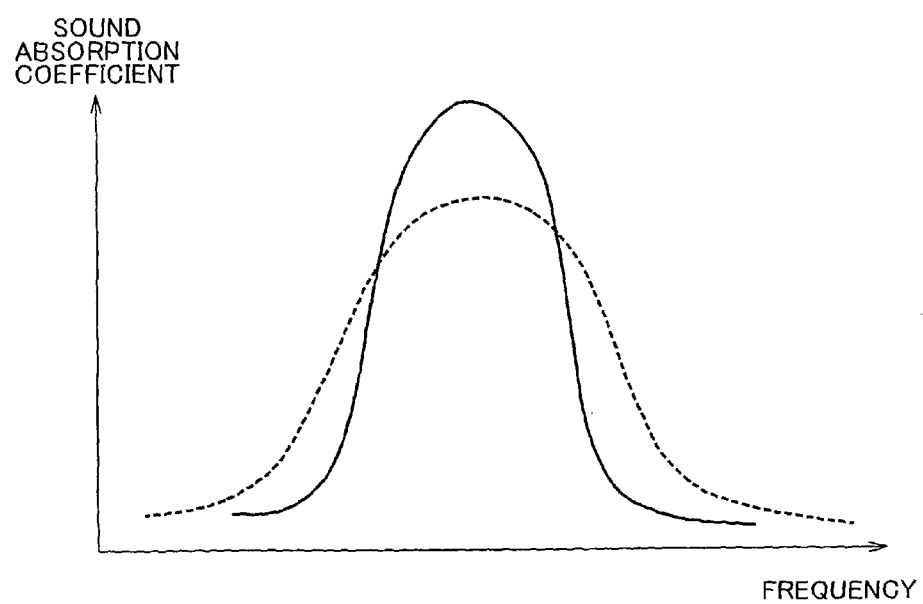
FIG. 10 is a chart that illustrates the relationship between a frequency and a sound absorption coefficient.

According to the second embodiment of the invention, the slit 64 extends in the direction along the end 14A of the divider 14 or in the vehicle width direction. Thus, when an acoustic wave enters the cell 12 through the slit 64, the phases of the acoustic waves 32 and 34 are matched over a wide frequency range. Therefore, as illustrated by a solid line in FIG. 10, the sound absorption coefficient with respect to the acoustic wave frequency of the sound to be absorbed further improves, compared to the case when no slit is provided (illustrated by a dotted line).

Figure 11:
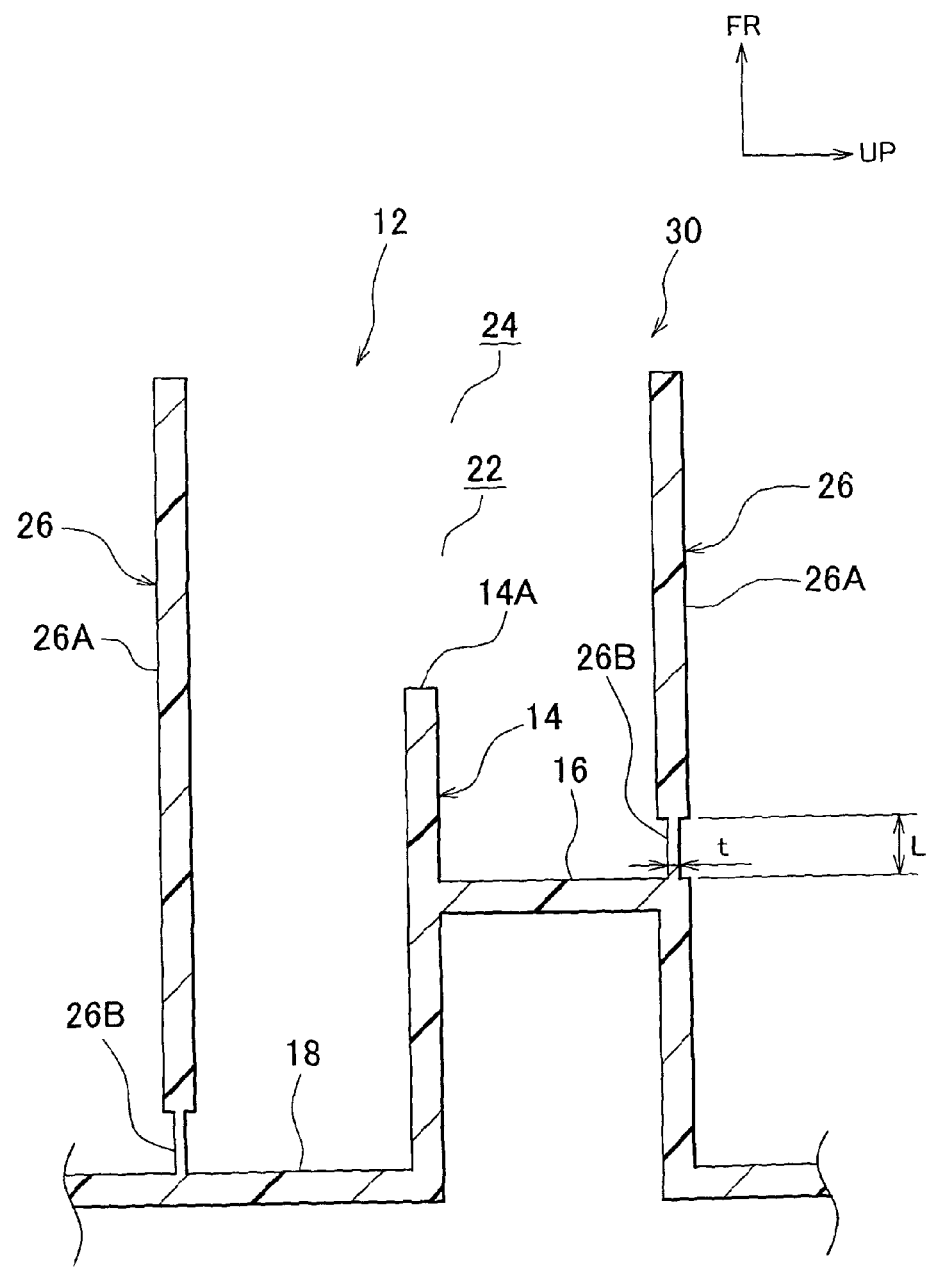
FIG. 11 is an enlarged sectional view of the vehicle sound absorption structure according to a third embodiment of the invention.

[Third Embodiment] As illustrated in FIG. 11, a vehicle sound absorption structure 30 according to the third embodiment of the invention includes the walls 26 that partition the cells 12 from each other. The walls 26 each include a base part 26B and the other part 26A. The base part 26B is thinner than the other part 26A. This causes film resonance to occur on the walls 26. Therefore, the vehicle sound absorption structure 30 has a sound absorption function that is provided by the walls 26 on which the film resonance occurs, in addition to the sound absorption function that is provided by the cells 12.

The walls 26 each connect to the reflector 16 or 18 at the base part 2613. The base part 26B is positioned deeper in the cell 12. The sound absorption performance obtained from the film resonance on the walls 26 can be controlled by varying a thickness t and a length L of the base part 26B. Specifically, as the thickness t of the base part 26B decreases or as the length L of the base part 2613 increases, the rigidity of the base part 26B decreases, so that a lower resonance frequency may be predetermined. In contrast, as the thickness t of the base part 26B increases or as the length L of the base part 26B decreases, the rigidity of the base part 26B increases, so that a higher resonance frequency may be predetermined.

As illustrated in FIG. 12, cuts 74 are provided at an intersection of the walls 26 to help the respective walls 26 vibrate more easily. A columnar portion 76 is formed in a square intersection surrounded by the cuts 74. It should be understood that the divider 14 is not illustrated in FIG. 12 for the sake of simplicity.

Other portions of the vehicle sound absorption structure 30 are the same as those according to the first embodiment. Therefore, in the drawings, like numerals are used to represent like elements, and the description of the like elements is not repeated. In addition, the third embodiment of the invention may be combined with at least one of the first and the second embodiments of the invention.

The vehicle sound absorption structure 30 according to the third embodiment of the invention has the aforementioned configuration, and the effect of vehicle sound absorption structure 30 will be described below. As illustrated in FIG. 11 and FIG. 12, in the vehicle sound absorption structure 30 according to the third embodiment of the invention, the walls 26 partition the cells 12 from each other. The walls 26 each have the base part 26B and the other portion 26A. The base part 26B is thinner than the other part 26A. Therefore, upon the entry of an acoustic wave into the cell 12, the film resonance occurs on the walls 26 in an arrow A-B direction and in an arrow C-D direction. Due to the film resonance, energy of the acoustic wave is converted into kinetic energy, so that the sound is absorbed. Particularly, the cuts 74 are provided at the intersection of the walls 26 to help the walls 26 vibrate more easily. Thus, upon the entry of an acoustic wave into the cells 12, the film resonance occurs efficiently on the walls 26. This further improves the sound absorption performance.

In addition, as the rigidity of the base part 26B of the wall 26 decreases, the vehicle sound absorption structure 30 deforms more easily upon a collision of the vehicle. This ensures shock absorbing performance upon a collision of the vehicle.

Fourth Embodiment

Figure 13:
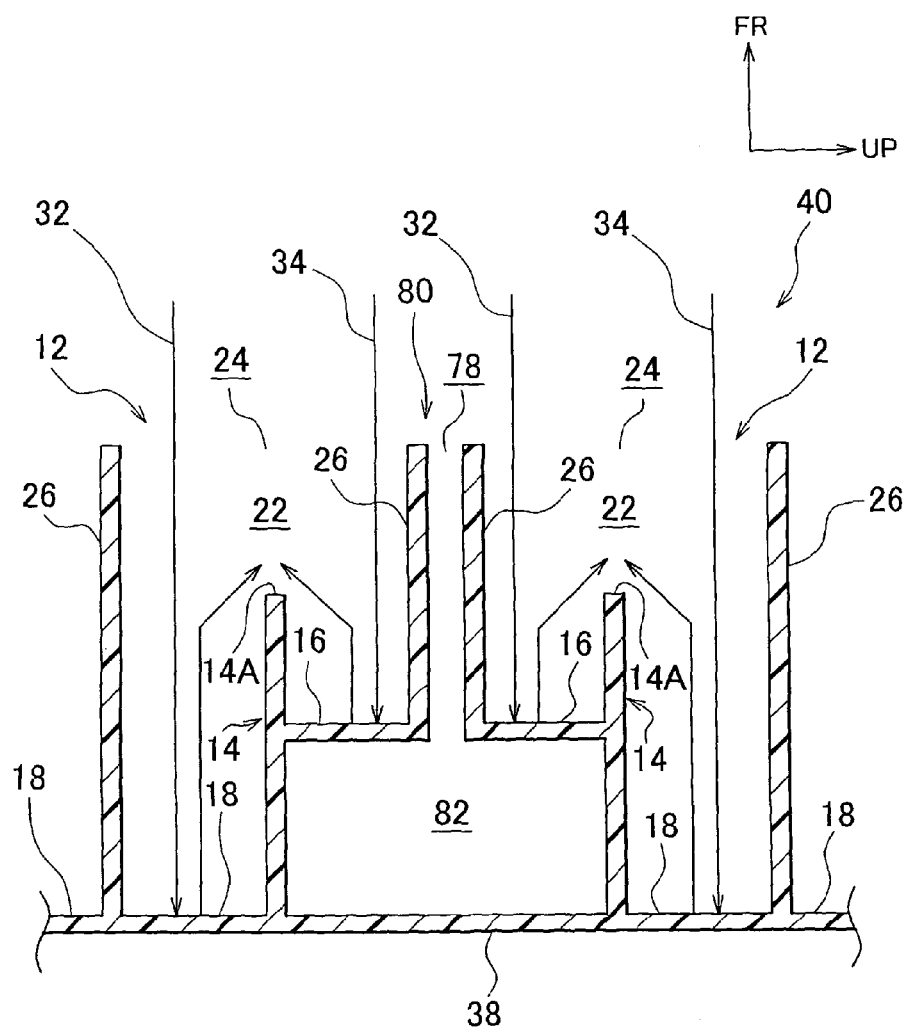
FIG. 13 is an enlarged sectional view of the vehicle sound absorption structure according to a fourth embodiment of the invention.

As illustrated in FIG. 13, a vehicle sound absorption structure 40 according to the fourth embodiment of the invention includes a Helmholtz resonator 80 adjacent to the cells 12. The Helmholtz resonator 80 has a neck 78 that is open toward the same direction as the opening 24. The neck 78 is an opening of the Helmholtz resonator 80. This opening is defined by the walls 26. A cavity 82 is defined more inward than the neck 78. The Helmholtz resonator 80 is a spring-mass resonance system in which the air in the neck 78 acts as a mass, while the air in the cavity 82 acts as a spring.

The Helmholtz resonator 80 is provided between the two adjacent cells 12. The two adjacent cells 12 are arranged symmetrically such that their respective reflectors 16 are adjacent to each other to form a space on the backside of the reflectors 16. This space is closed by a wall 38 to define the cavity 82. The wall 38 is continuously formed, for example, with the reflectors 18.

Figure 14:
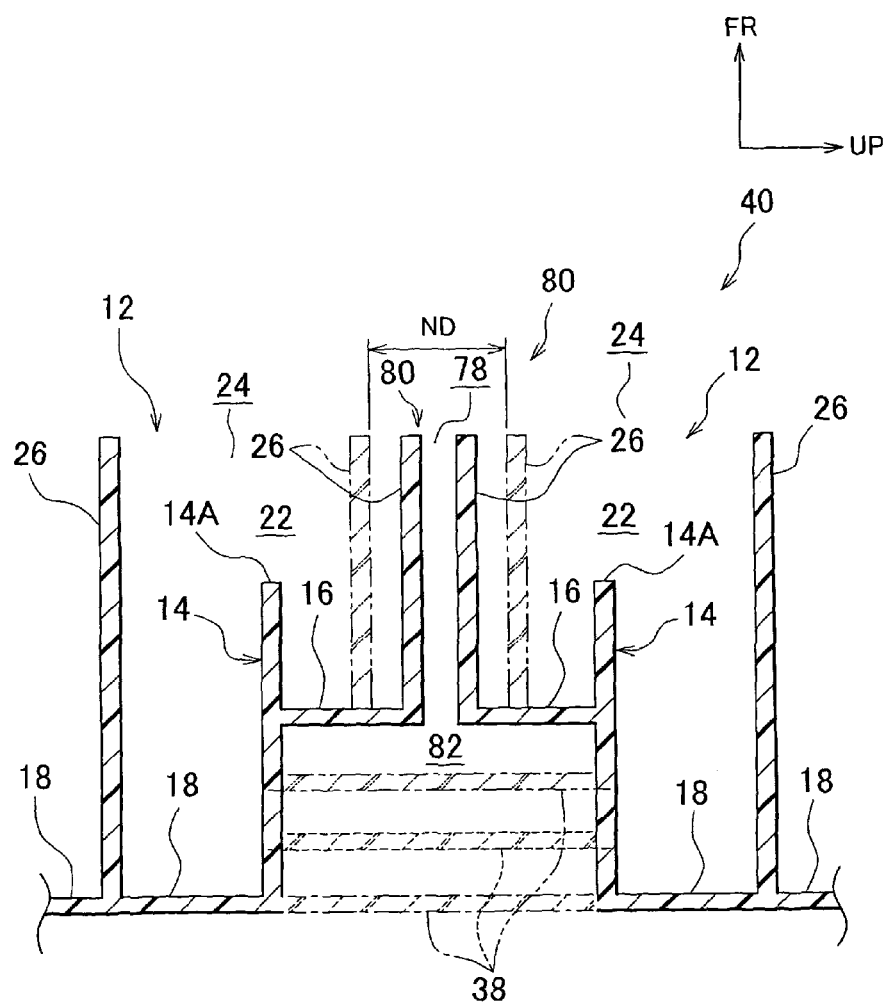
FIG. 14 is an enlarged sectional view of a modification of the vehicle sound absorption structure according to the fourth embodiment of the invention.
Figure 15:
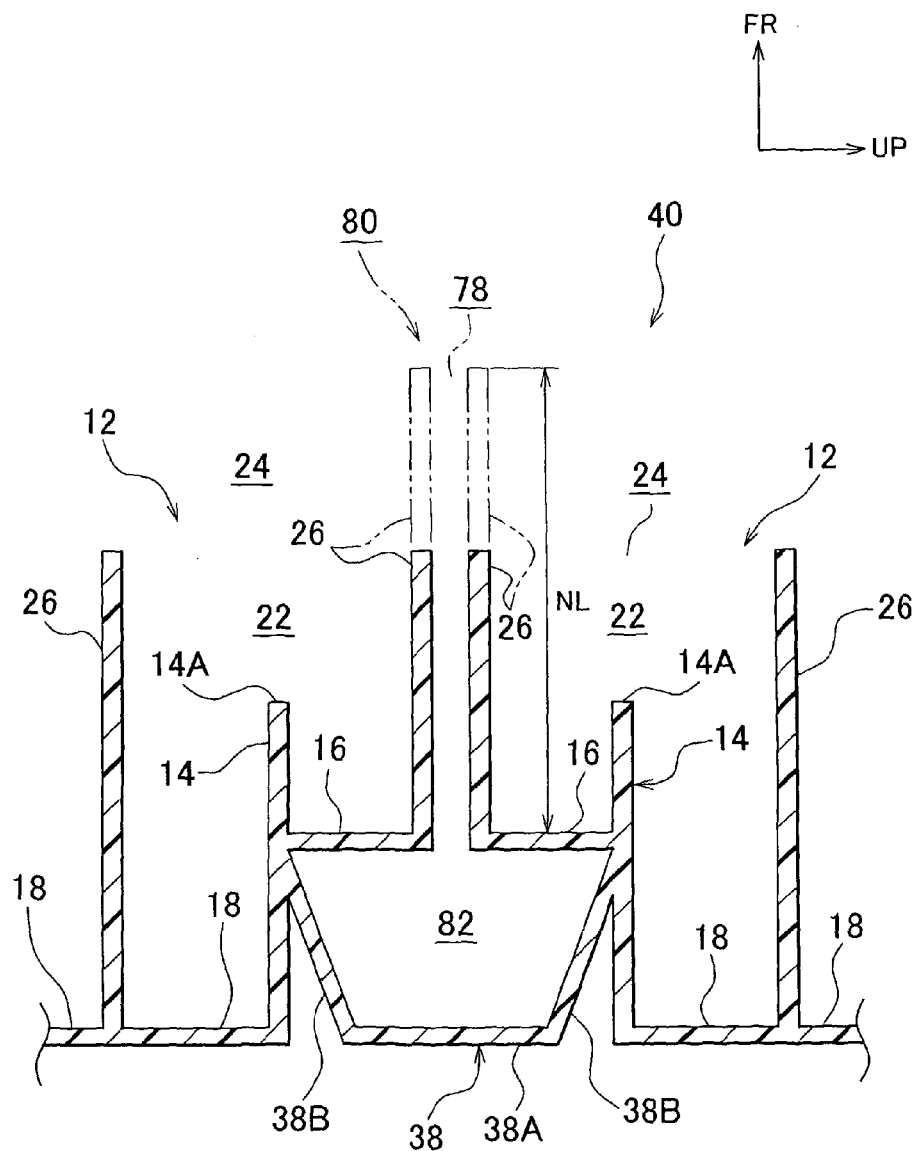
FIG. 15 is an enlarged sectional view of another modification of the vehicle sound absorption structure according to the fourth embodiment of the invention.

The Helmholtz resonator 80 has sound-absorption characteristics that can be adjusted, for example, by varying a volume of the cavity 82 or a diameter ND of the neck 78 as illustrated in FIG. 14, or by forming the cavity 82 into a trapezium or trapezoid (having two parallel edges) shape or varying a length NL of the neck 78 as illustrated in FIG. 15. In the example illustrated in FIG. 15, the wall 38 includes: an edge 38A that corresponds to an upper edge of the trapezium or trapezoid; and a pair of oblique edges 38B that extend respectively from opposite ends of the edge 38A. The oblique edges 38B each have an end on the side of the opening 24 and that is connected nearly to the intersection of the divider 14 and the reflector 16.

Other portions of the vehicle sound absorption structure 40 are the same as those according to the first embodiment. Therefore, in the drawings, like numerals are used to represent like elements, and the description of the like elements is not repeated. In addition, the fourth embodiment of the invention may be combined with at least one of the first, the second, and the third embodiments of the invention.

Figure 16:
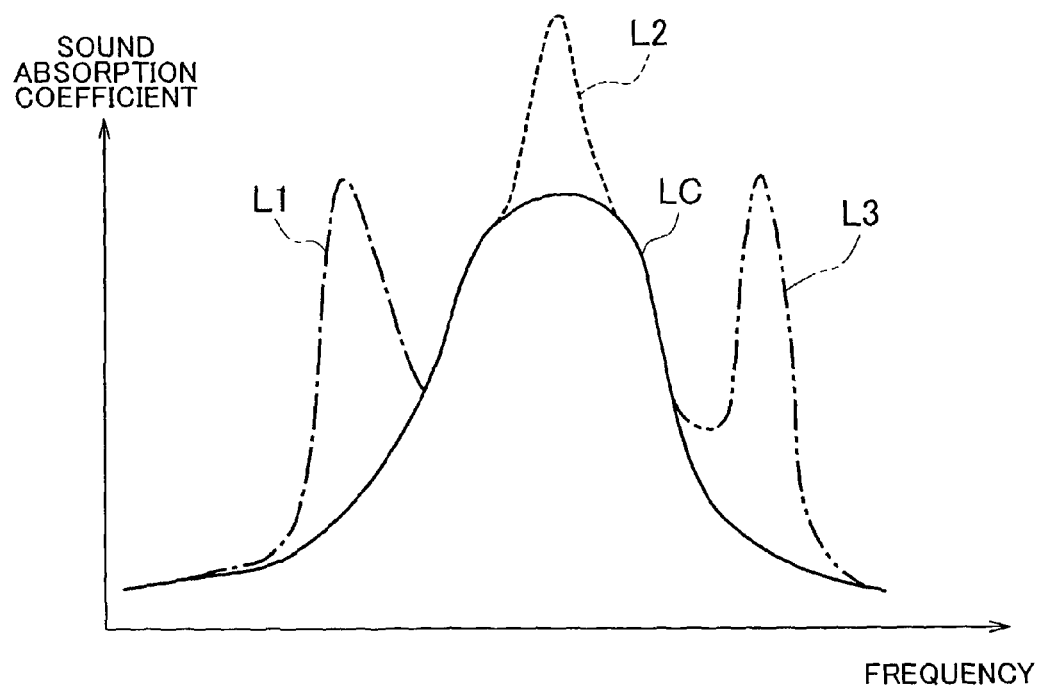
FIG. 16 is a chart that illustrates the relationship between a frequency and a sound absorption coefficient.

The vehicle sound absorption structure 40 according to the fourth embodiment of the invention has the aforementioned configuration, and the effect of vehicle sound absorption structure 40 will be described below. As illustrated in FIG. 13, as in the first embodiment, in a vehicle sound absorption structure 40 according to the fourth embodiment, an acoustic wave enters the cells' 12 to be divided into the one acoustic wave 32 and the other acoustic wave 34, and the one acoustic wave 32 is reflected at the reflector 16, while the other acoustic wave 34 is reflected at the reflector 18. Then, the one acoustic wave 32 and the other acoustic wave 34 interfere with each other and cancel each other out at the interfering portion 22. This produces a sound absorption effect, as illustrated by a solid line LC in FIG. 16.

In addition, according to the fourth embodiment of the invention, the Helmholtz resonator 80 is provided adjacent to the cells 12. This further improves the sound absorption performance. Specifically, the wall 38 or the bottom of the cavity 82 can be positioned as illustrated by a dot-and-dash line in FIG. 14 so that the volume of the cavity 82 increases. This improves the sound absorption coefficient in the low-frequency range, as illustrated in a dot-and-dash line L1 in FIG. 16.

Secondly, the wall 38 or the bottom of the cavity 82 can be positioned as illustrated by a dotted line in FIG. 14 so that the volume of the cavity 82 is slightly smaller than the aforementioned volume. This improves the sound absorption coefficient in the mid-frequency range, as illustrated in a dotted line L2 in FIG. 16.

Thirdly, the wall 38 or the bottom of the cavity 82 can be positioned as illustrated by a chain double-dashed line in FIG. 14 so that the volume of the cavity 82 is further smaller than the aforementioned volumes. This improves the sound absorption coefficient in the high-frequency range, as illustrated in a chain double-dashed line L3 in FIG. 16.

Figure 17:
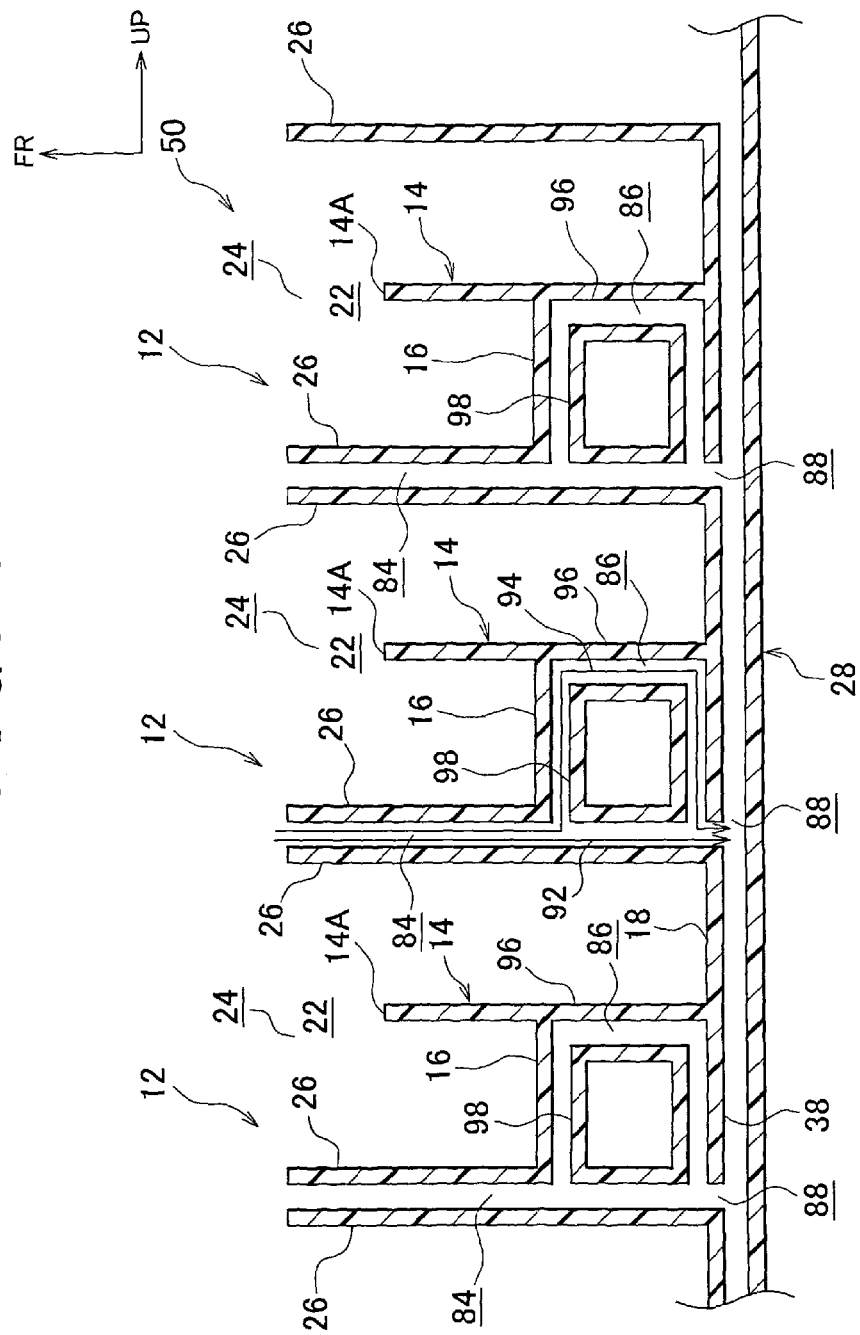
FIG. 17 is an enlarged sectional view of the vehicle sound absorption structure according to a fifth embodiment of the invention.

[Fifth Embodiment] As illustrated in FIG. 17, a vehicle sound absorption structure 50 according to the fifth embodiment of the invention includes: primary tubular passages 84; and secondary tubular passages 86, in addition to the cells 12. The primary tubular passage 84 and the secondary tubular passage 86 respectively have predetermined lengths such that acoustic waves 92 and 94 have a phase difference therebetween at a point 88 where the primary tubular passage 84 and the secondary tubular passage 86 join together. The acoustic wave 92 passes through the primary tubular passage 84 alone. The acoustic wave 94 rejoins the primary tubular passage 84 via the secondary tubular passage 86.

The primary tubular passage 84 is provided adjacent to the cells 12 and is open toward the same direction as the opening 24. The secondary tubular passage 86 is branched from the primary tubular passage 84 at its midsection and rejoins the primary tubular passage 84. The secondary tubular passage 86 is formed, for example, along the backside of the reflector 16, along a wall 96, and then along the wall 38. The wall 96 is continuously formed with the divider 14. The wall 38 is continuously formed with the reflector 18. Additionally, isolated portions 98 are provided to define the primary tubular passages 84 and the secondary tubular passages 86. The isolated portions 98 are each spaced apart from the wall 26, the backside of the reflector 16, the wall 96, and the wall 38. The isolated portions 98 are each formed into, for example, a hollow profile.

The length of the secondary tubular passage 86 may be set to $\lambda/2$ (a half wavelength) relative to the wavelength $\lambda$ of the acoustic wave frequency of the sound to be absorbed. Because this results in the maxim sound absorption coefficient when the acoustic waves 92 and 94 interfere with each other and cancel each other out at the point 88 after the acoustic wave 92 passes through the primary tubular passage 84 alone, while the acoustic wave 94 rejoins the primary tubular passage 84 via the secondary tubular passage 86.

Other portions of the vehicle sound absorption structure 50 are the same as those according to the first embodiment. Therefore, in the drawings, like numerals are used to represent like elements, and the description of the like elements is not repeated. In addition, the fifth embodiment of the invention may be combined with at least one of the first, the second, and the third embodiments of the invention.

The vehicle sound absorption structure 50 according to the fifth embodiment of the invention has the aforementioned configuration, and the effect of vehicle sound absorption structure 50 will be described below. As illustrated in FIG. 17, the vehicle sound absorption structure 50 according to the fifth embodiment of the invention produces another sound absorption effect in addition to the sound absorption effect provided by the cells 12. The other sound absorption effect is produced in the following manner: The acoustic wave 92 passes through the primary tubular passage 84 alone, while the acoustic wave 94 rejoins the primary tubular passage 84 via the secondary tubular passage 86, so that these acoustic waves 92 and 94 have a phase difference of, for example, a half wavelength therebetween, and then interfere with each other at the point 88 where the primary tubular passage 84 and the secondary tubular passage 86 join together. The damped acoustic waves by the interference pass through between the vehicle sound absorption structure 50 and, for example, the separate fender protector 28. The fender protector 28 will be described below. According to the fifth embodiment of the invention, the space defined on the backside of the reflector 16 is utilized to efficiently improve the sound absorption performance.

It should be understood that the structures of the primary tubular passage 84 and the secondary tubular passage 86 are not limited to the illustrated examples.

Figure 18:
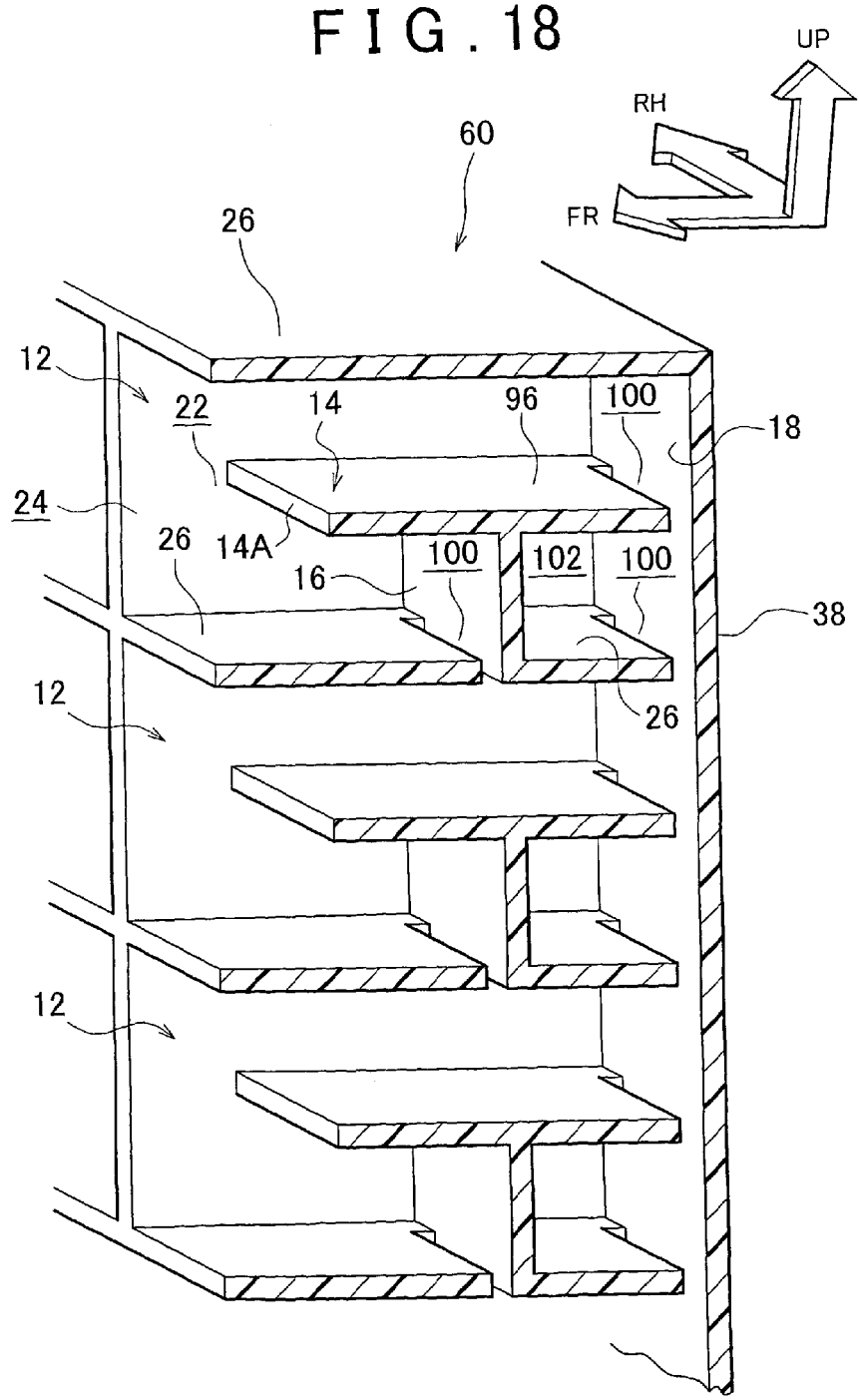
FIG. 18 is a perspective sectional view of the vehicle sound absorption structure according to a sixth embodiment of the invention.

[Sixth Embodiment] As illustrated in FIG. 18, a vehicle sound absorption structure 60 according to the sixth embodiment of the invention includes the plural cells 12 that are arranged in parallel in the vertical direction with their openings 24 facing toward the front side of the vehicle. The cells 12 each have the walls 26 and 96. The walls 26 and 96 are an example of the lower walls. The wall 96 is continuously formed with the divider 14. The walls 26 and 96 have respective communication holes 100 that communicate with the immediately lower adjacent one of the cells 12. These communication holes 100 are provided respectively, for example, on the walls 26 and 96 at their rear ends. The reason for this is that in the case the cells 12 contain water, when the vehicle is accelerating, an inertia force causes the water to flow toward the rear side of the vehicle to be discharged through the communication holes 100. The backside of the reflector 16, the walls 26 and 96, and the wall 38 define a cavity 102.

It should be understood that the walls 26 and 96 may be angled downwardly to the front side of the vehicle. The walls 26 and 96 are an example of the lower walls. The wall 96 is continuously formed with the divider 14. These angled walls 26 and 96 make it difficult for the water to remain in the cells 12. In the case the communication holes 100 are formed through the lower walls, a similar communication hole (not illustrated) may also be formed through an upper wall (for example, the divider 14). The reason for this is that it is considered relatively easy to form the communication holes through the individual walls.

The arrangement direction of the vehicle sound absorption structure 60 may be varied such that, for example, the openings 24 can be positioned on the upper side of the vehicle, while the reflectors 16 and 18 can be positioned on the lower side of the vehicle. In this case, the communication holes 100 may be formed through the reflectors 16 and 18.

Other portions of the vehicle sound absorption structure 60 are the same as those according to the first embodiment. Therefore, in the drawings, like numerals are used to represent like elements, and the description of the like elements is not repeated. In addition, the sixth embodiment of the invention may be combined with at least one of the first, the second, the third, the fourth, and the fifth embodiments of the invention.

Figure 19:
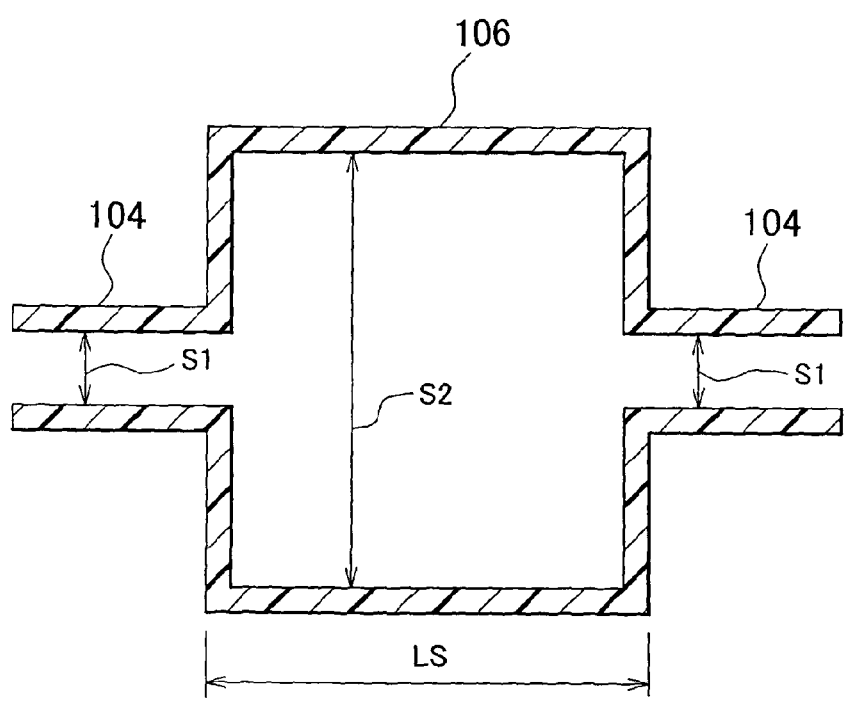
FIG. 19 is a schematic view of an expansion silencer.

The vehicle sound absorption structure 60 according to the sixth embodiment of the invention has the aforementioned configuration, and the effect of vehicle sound absorption structure 60 will be described below. As illustrated in FIG. 18, in the vehicle sound absorption structure 60 according to the sixth embodiment of the invention, the communication holes 100 are formed respectively through the lower walls of the cell 12 or the walls 26 and 96 at their rear ends. The communication holes 100 each communicate with the immediately lower adjacent one of the cells 12. This provides an additional function as an expansion silencer in addition to the sound absorption function provided by the cells 12. Specifically, the cavity 102 and the communication holes 100 that are formed above and below the cavity 102 act as the expansion silencer illustrated in FIG. 19. This further improves the sound absorption performance.

When S1 is a cross-sectional area of a smaller-diameter portion 104 that corresponds to the communication hole 100, S2 is a cross-sectional area of a larger-diameter portion 106 that corresponds to the cavity 102, and LS is a length of the larger diameter portion 106, transmission loss TL is expressed as the following equation 1, where: m=S2/S1, f is frequency and c is velocity of sound.

$$TL = 10\log\left[1 + \frac{1}{4}\left(m - \frac{1}{m}\right)^2 \sin^2\frac{2\pi f}{c}LS\right]$$ Equation 1

The water in the cells 12 can be drained through the communication holes 100. Specifically, in the case the water (not illustrated) enters the cells 12, when the vehicle is accelerating, an inertial force causes the water to flow toward the rear side of the vehicle. Thus, the water drops through the communication holes 100 to the lower cells 12 sequentially. This allows the water in the cells 12 to be efficiently discharged out of the cells 12. This prevents the water from remaining in the cells 12, and thus prevents a decrease in sound absorption performance due to freezing of the water, thereby maintains the sound absorption performance. It should be understood that when the vehicle is decelerating, the water is discharged from the openings 24 of the cells 12. In addition, the walls 26 and 96 may be angled downwardly to the front side of the vehicle to make it difficult for the water to remain in the cells 12. The walls 26 and 96 are an example of the lower walls. The wall 96 is continuously formed with the divider 14.

Figure 20:
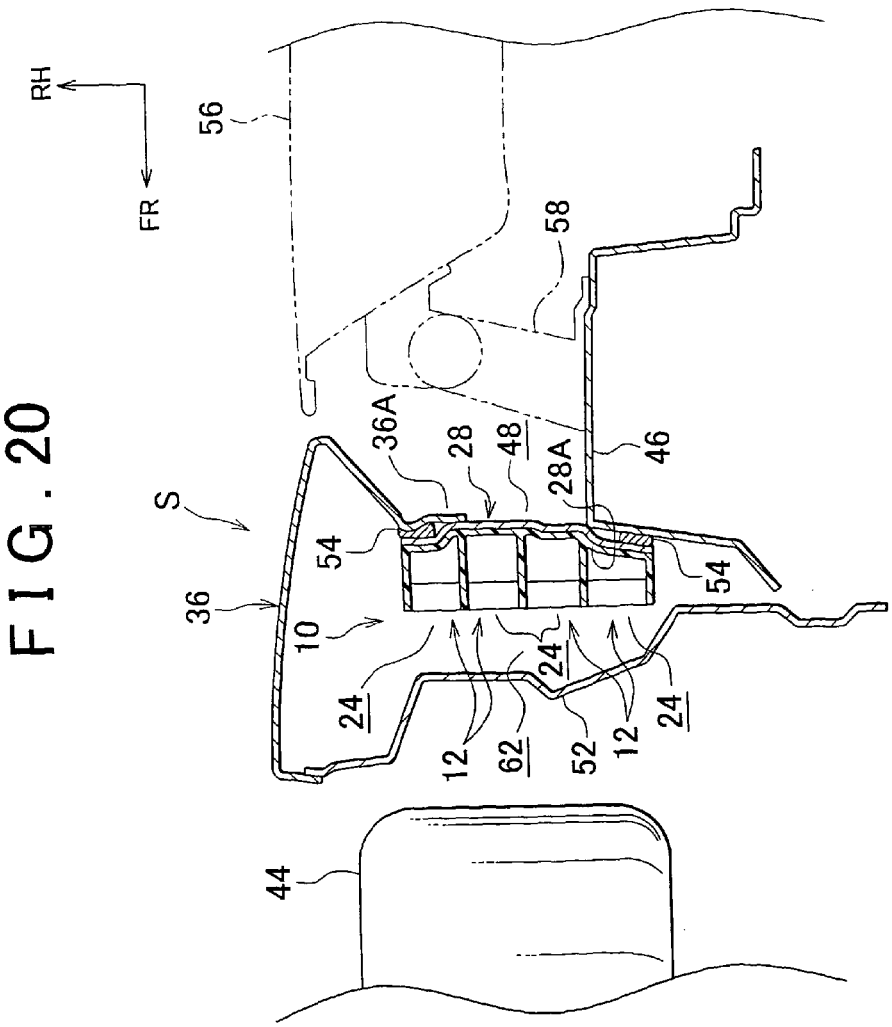
FIG. 20 is a sectional view of the front fender structure in which the vehicle sound absorption structure according to the other embodiment of the invention is provided on a front surface of a fender protector.

(Other Embodiment) As illustrated in FIG. 20, the vehicle sound absorption structure 10 may be separated from the fender protector 28. The fender protector 28 includes a front surface 28A. The vehicle sound absorption structure 10 may be mounted onto the front surface 28A, using, for example, a clip (not illustrated), such that the openings 24 of the cells 12 face toward the front side of the vehicle.

The fender protector 28 is a member designed to shield the gap 48 between the vehicle body framework 46 and the rear end 36A of the front fender panel 36. The rear end 36A is positioned inner side of the vehicle. The fender protector 28 is secured to the front fender panel 36 at its rear end 36A and to the vehicle body framework 46 on its forward side of the vehicle, using, for example, an adhesive 54.

The vehicle sound absorption structure 10 is provided on the front surface 28A of the fender protector 28 such that the plural cells 12 are arranged in parallel in the vertical direction with their respective openings 24 facing toward the front side of the vehicle. This allows the sound absorption effect to be produced in a wide region, thus to efficiently absorb noise from the front tyre 44 at low cost.

Figure 21:
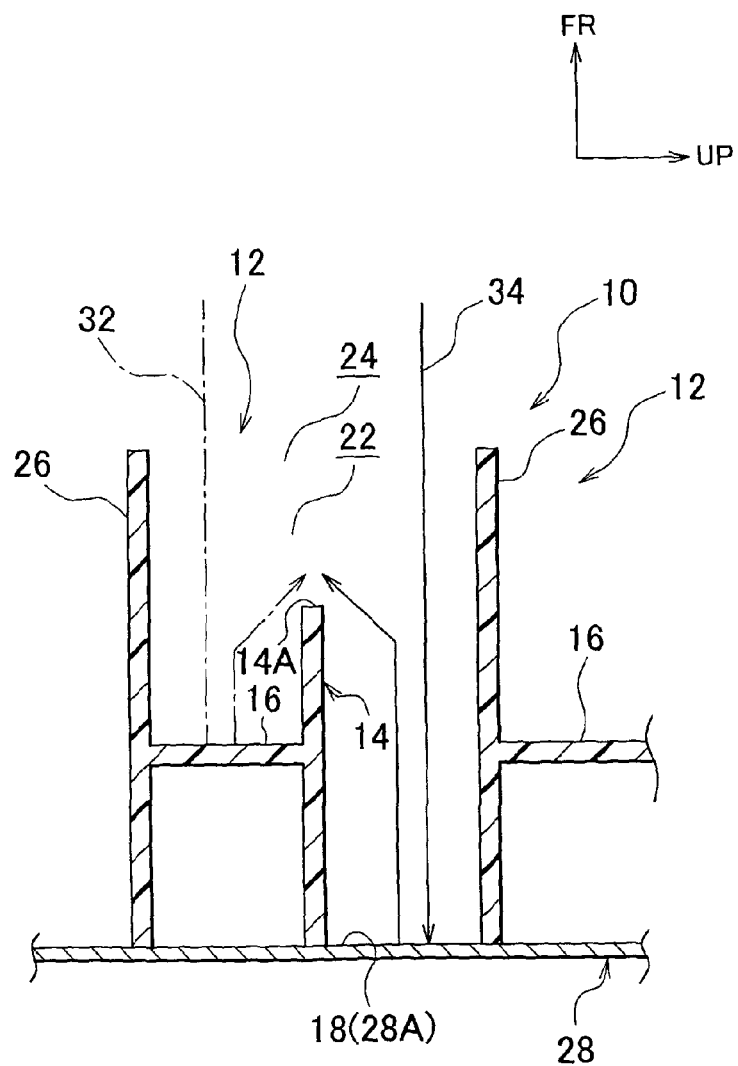
FIG. 21 is an enlarged sectional view that illustrates an example in which the front surface of the fender protector is utilised as a reflector.

(Further Other Embodiment) illustrated as a further modification of the vehicle sound absorption structure 10 in FIG. 21, the cell 12 may be open on its rear end side to be shielded by a separate member such that the separate member may be utilised as the reflector 18. The separate member is, for example, the fender protector 28. In other words, the vehicle sound absorption structure 60 according to the sixth embodiment is not limited to the configuration illustrated in FIG. 18 in which the rear part of the vehicle sound absorption structure 60 is shielded by the wall 38 that is continuously formed with the wall 26 of the cell 12.

Figure 22:
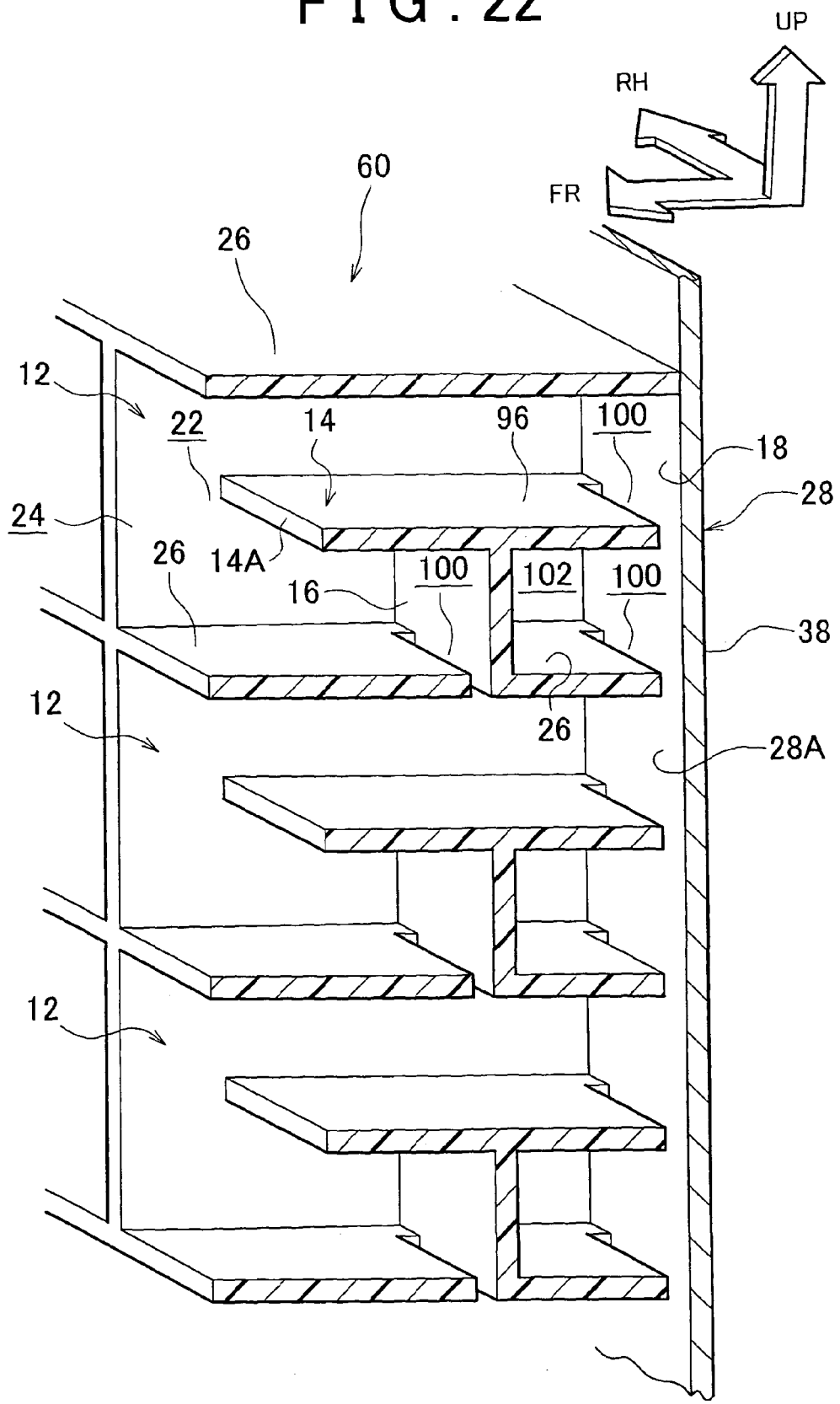
FIG. 22 is a perspective sectional view of a modification of the vehicle sound absorption structure.

According to the further modification, the front surface 28A of the fender protector 28 is utilised as the reflector 18. This enables reductions in material costs of and in weight of the vehicle sound absorption structure 10, compared to the case when the reflector 18 is continuously formed with the wall 26 of the cell 12. As illustrated in FIG. 22, the walls 26 and 96 may have notches at their respective rear ends, and these rear ends may be shielded by a separate member (fender protector 28). This facilitates forming of the communication holes 100. Therefore, the vehicle sound absorption structure 60 has improved formability.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle sound absorption structure comprising:
a recessed cell that has an opening on one end thereof;
a divider that is provided within the cell and that divides an acoustic wave entering the cell from the opening into two acoustic waves;
reflectors that reflect one of the two acoustic waves divided at the divider and reflect the other acoustic wave respectively toward the opening, and that generate a phase difference between the one acoustic wave and the other acoustic wave;
an interfering portion that is provided within the cell and that causes the one acoustic wave and the other acoustic wave, which have been respectively reflected at the reflectors, to interfere with each other; and
a cover member that covers the opening and which has a slit provided on an extension of the divider.

2. The vehicle sound absorption structure according to claim 1, wherein:
the divider has an end on a side of the opening and positioned more inward in the cell than the opening, while being positioned closer to the opening than one of the reflectors, the one of the reflectors being positioned closer to the opening than the other reflector; and
the interfering portion is positioned between the end and the opening.

3. The vehicle sound absorption structure according to claim 2, wherein the slit extends in a direction along the end of the divider.

4. The vehicle sound absorption structure according to claim 1, wherein the cell is partitioned by a wall that includes a base part and the other part, the base part being thinner than the other part.

5. The vehicle sound absorption structure according to claim 1, wherein:
the vehicle sound absorption structure also serves as a fender protector that shields a gap between a vehicle body framework and a rear end of a front fender panel, the rear end being positioned inner side of the vehicle; and
the opening is formed toward the front side of the vehicle.

6. The vehicle sound absorption structure according to claim 1, wherein the vehicle sound absorption structure is provided on a front surface of a fender protector that shields a gap between a vehicle body framework and a rear end of a front fender panel, a front surface facing toward the front side of the vehicle, the rear end being positioned inner side of the vehicle.

7. The vehicle sound absorption structure according to claim 6, wherein:
the vehicle sound absorption structure is formed in combination with the fender protector; and
a front surface of the fender protector is utilised as the reflectors, the front surface facing toward the front side of the vehicle.

8. The vehicle sound absorption structure according to claim 1, wherein:
the vehicle sound absorption structure also serves as a fender liner that is formed on an inside of the front fender panel to cover a front tyre; and
the opening is formed toward the front side of the vehicle.

9. The vehicle sound absorption structure according to claim 1, wherein:
a plurality of the cells are arranged in parallel in a vertical direction with the opening of each of the cells facing toward the front side of the vehicle; and
communication holes communicating with a lower adjacent one of the cells are formed on lower walls of the cells.

10. The vehicle sound absorption structure according to claim 9, wherein the lower walls are angled downwardly to the front side of the vehicle.

11. The vehicle sound absorption structure according to claim 9, wherein the communication holes are provided on the lower walls at respective ends on the rear side of the vehicle.

12. The vehicle sound absorption structure according to claim 1, further comprising a Helmholtz resonator that is provided adjacent to the cells and that has a neck and a cavity, the neck being open in the same direction as the opening,
wherein the neck is an opening of the Helmholtz resonator, the opening being defined by the walls.

13. The vehicle sound absorption structure according to claim 12, wherein a volume of the cavity, a diameter of the neck or a length of the neck is varied in order to adjust sound-absorption characteristics of the Helmholtz resonator.

14. The vehicle sound absorption structure according to claim 13, wherein the cavity is formed into a trapezium or trapezoid shape.

15. The vehicle sound absorption structure according to claim 1, further comprising:
a primary tubular passage that is provided adjacent to the cells and is open toward the same direction as the opening; and
a secondary tubular passage that is branched from the primary tubular passage at a midsection of the primary tubular passage and that rejoins the primary tubular passage at a point where the primary tubular passage and the secondary tubular passage join together,
wherein the primary tubular passage and the secondary tubular passage respectively have predetermined lengths such that an acoustic wave passing through the primary tubular passage alone and another acoustic wave rejoining the primary tubular passage via the secondary tubular passage have a phase difference therebetween at the point where the primary tubular passage and the secondary tubular passage join together.

16. A front fender structure comprising:
a front fender panel;
a fender protector that shields a gap between a vehicle body framework and a rear end of the front fender panel, the rear end being positioned inner side of the vehicle; and
a vehicle sound absorption structure according to claim 1,
wherein the vehicle sound absorption structure being mounted onto a surface of the fender protector with the opening facing toward the front side of the vehicle, the surface facing toward the front side of the vehicle,
wherein a plurality of the cells are arranged in parallel in a vertical direction, and the cells each have lower walls through which communication holes are formed, the communication holes communicating with a lower adjacent one of the cells.

17. The vehicle sound absorption structure according to claim 1, wherein the reflectors comprise a first reflector and a second reflector, the first reflector is disposed at a different depth with respect to the opening than the second reflector.

* * * * *